United States Patent [19]
Cubley et al.

[11] Patent Number: 5,122,795
[45] Date of Patent: Jun. 16, 1992

[54] SCANNING RECEIVER FOR NATIONWIDE RADIO PAGING SYSTEM

[75] Inventors: H. Dean Cubley, Houston; Bartus H. Batson, Pearland, both of Tex.; Thomas D. DiNoto, Del Mar, Calif.; John B. Macleod, Houston, Tex.; Robert M. Skomer, San Diego, Calif.

[73] Assignee: Metrocast, San Diego, Calif.

[21] Appl. No.: 318,427

[22] Filed: Mar. 1, 1989

Related U.S. Application Data

[63] Continuation of Ser. No. 763,711, Aug. 8, 1985, abandoned.

[51] Int. Cl.$^5$ .............................................. G08B 5/22
[52] U.S. Cl. ............................ 340/825.44; 379/57; 455/32.1
[58] Field of Search ............ 340/825.44, 825.48; 455/12, 32-34, 38, 150, 161, 179, 343, 36; 379/57, 58

[56] References Cited

U.S. PATENT DOCUMENTS

| | | | |
|---|---|---|---|
| 3,575,558 | 4/1971 | Leyburn et al. | 179/41 R |
| 3,641,276 | 2/1972 | Keller et al. | 179/18 BF |
| 3,714,375 | 1/1973 | Stover | 179/2 E |
| 3,818,145 | 6/1974 | Hanway | 179/41 A |
| 3,836,726 | 9/1974 | Wells | 179/41 A |
| 4,000,486 | 12/1976 | Brown et al. | 364/200 |
| 4,013,958 | 3/1977 | Spayth | 455/32 |
| 4,149,125 | 4/1979 | Ikeguchi et al. | 331/1 A |
| 4,178,475 | 12/1979 | Taylor et al. | 179/2 EC |
| 4,178,476 | 12/1979 | Frost | 179/2 EC |
| 4,180,776 | 12/1979 | Lindemann | 455/77 |
| 4,249,165 | 2/1981 | Mori | 455/38 |
| 4,276,654 | 6/1981 | Nations et al. | |
| 4,280,104 | 7/1981 | Rzeszewski | 331/1 A |
| 4,303,893 | 12/1981 | Goldberg | 331/1 A |
| 4,314,208 | 2/1982 | Munday | 331/1 A |
| 4,352,955 | 10/1982 | Kai et al. | 455/38 |
| 4,383,257 | 5/1983 | Giallanza et al. | 340/825.47 |
| 4,388,596 | 6/1983 | Yamashita | 331/1 A |
| 4,392,135 | 7/1983 | Ohyagi | 340/825.44 |
| 4,403,212 | 9/1983 | Masaki | 340/311.1 |
| 4,419,765 | 12/1983 | Wycoff et al. | 340/825.48 |
| 4,431,991 | 2/1984 | Bailey et al. | 340/825.52 |
| 4,434,504 | 2/1984 | Fredrickson | 455/32 |
| 4,434,506 | 2/1984 | Fujiwara et al. | 179/2 EB |
| 4,464,638 | 8/1984 | Crowley et al. | 331/1 A |
| 4,556,760 | 12/1985 | Goldman | 179/2 EB |
| 4,644,347 | 2/1987 | Lucas et al. | 340/825.44 |
| 4,734,694 | 3/1988 | Umetsu et al. | 340/825.44 |

FOREIGN PATENT DOCUMENTS

| | | |
|---|---|---|
| 0040954 | 12/1981 | European Pat. Off. |
| 0124788 | 11/1984 | European Pat. Off. |
| 0145171 | 6/1985 | European Pat. Off. |
| 197059 | 11/1983 | New Zealand |
| WO82/01268 | 4/1982 | World Int. Prop. O. ......... 455/343 |

OTHER PUBLICATIONS

Electronic International, "Paging System Broadcasts Nationwide On FM Radio Channel", Jan. 4, 1979.
Cue Pager Advertisement, Jan. 4, 1979.

*Primary Examiner*—Ulysses Weldon
*Attorney, Agent, or Firm*—Banner, Birch, McKie & Beckett

[57] ABSTRACT

A scanning radio reciever for a wide area paging system which interconnects conventional radio common carriers (RCC) for broadcasting page information. A plurality of RCC's in each geographical area served by the paging system of the invention are connected to a local page processor. The local page processor processes incoming page information and transfers the information to an available RCC for broadcast in the local area. If broadcast of the page information is also desired in a remote geographical area, a copy of the page information is transferred to a central page processor for distribution to the selected remote geographical area for broadcast. The paging receiver is designed so that it scans the frequency of a plurality of RCCs. Thus, the same receiver may be used to receive pages from more than one RCC.

55 Claims, 9 Drawing Sheets

FIG. 3
PAGING RECORD FORMAT

```
          1         2         3         4         5         6
 1234567890123456789012345678901234567890123456789012345678901234
 CSID.RID.S..D..DATEHMMNNNNNPPPPPXS..T..THM---B[----|-----------]
 [---|-----2-----|-------3------|--------------|-----5-----]
          7         8         9         0         1         2
 567890123456789012345678901234567890123456789012345678
 [-----|------2-----|------3-----|------4-----|------5-----]
```

FIG. 5

| 0 | 1 | 2 | 3 | 4 | 5 | 6 | 7 |
|---|---|---|---|---|---|---|---|
| P | P | P | P | A | S | A | L | L | R | L | R | R |
| 1 | 3 | 5 | 2 | 3 | T | 1 | 2 | 3 | 2 | 3 | 1 | 2 | 3 |
| 2 | 4 | 6 | | | | | | | | | | |

SCANNING RECEIVER FOR NATIONWIDE RADIO PAGING SYSTEM

This application is a continuation of application Ser. No. 763,711, filed Aug. 8, 1985 now abandoned.

BACKGROUND OF THE INVENTION

The present invention relates to the field of remote signaling systems, and more particularly, is directed to a nationwide radio paging system which interconnects presently existing local paging services into a nationwide network. The system permits subscribers to travel virtually anywhere in the country and continue to receive pages originated from their home service area.

The concept of a wide area paging system is not new. In fact, several such systems have been proposed and described in the prior art. One such system is described in U.S. Pat. No. 3,575,558 issued to Leyburn. The Leyburn patent discloses a paging system which is said to permit simultaneous paging in more than one geographical area. The system comprises one or more storage centers which control a plurality of transmitters located in different geographical areas. When a storage center receives a page request, it consults its internal memory to determine in which areas the subscriber desired paging service. The storage center then transfers the paging information via telephone lines to dedicated transmitters serving the areas selected for paging by the subscriber.

Other wide area paging systems are disclosed in U.S. Pat. No. 3,818,145 to Hanway and U.S. Pat. No. 3,714,375 to Stover. The Hanway patent describes a paging system which extends the paging area by broadcasting the page over a plurality of transmitters. A page request received at one transmitter site is relayed to other transmitter sites. The transmitters are then activated to transmit the page. The Stover patent is directed to a paging system which transmits paging information over existing AM broadcast stations using a non-interferring phase modulation technique. Extended area coverage is achieved due to the relatively high power used by the broadcast station.

A more sophisticated wide area paging system is disclosed in U.S. Pat. No. 4,178,476 to Frost. The Frost patent is directed to a wide area paging system which privides local-only paging as well as wide area paging. In the local-only mode, the system operates in the same manner as conventional paging systems known prior to Frost. In the wide area paging mode, however, paging service may be transferred from one location to another by a transfer command entered into the system via a telephone hook-up. Thus, all pages originated anywhere within the system are transferred to the area where the subscriber is located. Broadcast of pages is temporarily suspended while the subscriber is in transit. Any pages which originate during this period are stored and then transferred to the area to which the subscriber has relocated when paging is reinstated on his arrival. The area from which the pages originate is also identified to the subscriber when they are broadcast. When a subscriber wishes to suspend paging service prior to travelling to another location, he first dials a predetermined telephone number to access the system. On receipt of an answer tone, the subscriber dials his unique identification number followed by a "suspend" digit. The system then suspends all paging to that subscriber and stores any pages received during the suspension period. When the subscriber reaches his destination, he makes another local telephone call to access the system in that area. Upon receipt of the answer tone the subscriber dials his unique identification number and a "reinstate" digit. Paging is then resumed and any pages originated during the time paging was suspended are forwarded to the new paging system and transmitted in the new area. Subsequent pages are transferred to the subscriber in that area until paging is again suspended and transferred to another area.

Though the above-described wide area paging systems represent an improvement over the existing prior art at the time, they fail to provide a cost effective system for broadcasting pages over a wide area. For example, these systems all relay on dedicated equipment installations to process and broadcast pages. Thus, these systems cannot be easily and economically extended to cover additional service areas.

SUMMARY OF THE INVENTION

It is therefore the overall object of the present invention to provide a wide are paging system which is simple in operation and cost effective to implement.

It is a specific object of the present invention to provide a wide area paging system which uses existing radio common carrier paging systems to broadcast pages.

It is another specific object of the present invention to provide a wide area paging system which can economically process and broadcast alphanumeric, numeric and tone only messages to a remote signalling receiver.

It is a further specific object of the present invention to provide a wide area paging system which provides distribution of pages expensively through an orbiting satellite to Earth stations.

It is another specific object of the present invention to provide a wide area paging system which concentrates the paging data into digital packets in order to reduce data transmission requirements.

It is another specific object of the present invention to provide a wide area paging system wherein the subscriber can roam anywhere in the country covered by the system and continue to receive pages originated from his home service area.

It is a still further specific object of the present invention to provide a wide area paging system wherein the calling party is not required to know where the subscriber is physically located within the country in order to effect a page to the subscriber.

It is a still further specific object of the present invention to provide a wide area paging system wherein local paging as well as nationwide paging is provided.

It is another specific object of the present invention to provide a wide area paging system wherein one paging receiver is used for local as well as nationwide pages.

It is another specific object of the present invention to provide a wide area paging system wherein the pages can be broadcast over any presently existing radio common carrier paging system within any of the RCC frequency bands.

It is a still further object of the present invention to provide a wide are paging system wherein the paging receiver automatically scans a plurality of frequency channels of presently existing radio common carrier or wireline paging systems for paging information.

These and other objects of the present invention are achieved by connecting presently existing local paging systems into a nationwide network. Local paging systems, or so-called radio common carriers (RCCs), now operate on frequencies in the low band VHF, UHF, and 900 MHz band. The paging receivers used with these RCCs are tuned only to the frequency used by their respective RCC. Thus, one RCC's receivers cannot be used with another RCC operating on a different frequency. Moreover, in order to avoid interference, only one RCC can use the same frequency in the same geographical area at the same time. The RCCs are local-only systems as the subscriber can receive pages only while present in his assigned geographical area served by the RCC from which he has contracted for services.

The Federal Communications Commission (FCC) recently recognized that local-only paging systems fail to meet the paging needs of a mobile society and has taken steps to establish a structure for development of a nationwide common carrier paging system. Three frequency channels were set aside in the 900 MHz band for nationwide paging use. Local-only paging, however, will not be permitted on these frequencies under current FCC regulations. Each of the frequencies will be controlled by *one* licensed common carrier, the so-called 931 MHz "Network organizers," who will determined the structure of the system and decide such technical details as the modes of operation, signaling format and interconnection schemes. The services of the 931 MHz organizers will be distributed to subscribers through a local common carrier in each community, the so-called 931 MHz "Network operator." The 931 MHz operators will provide local page initiation and/or local distribution of nationwide pages on the frequency controlled by their respective organizer. In summary, the 931 MHz organizers will be the licensees of the frequencies, control their operation and furnish nationwide interconnection services to the local 931 MHz operators around the country. Though the designs vary, each system ultimately uses one of the three 931 MHz frequencies as the nationwide connecting link to deliver the paging information.

One of the drawbacks to the 931 MHz scheme is that it does not provide for local-only paging. Thus, a subscriber would have to carry two paging receivers, one for nationwide paging tuned to one of the three nationwide paging frequencies and one for local paging tuned to one of the local paging frequencies. Secondly, the 931 MHz scheme is a totally new concept and equipment of its implementation presently exists in limited quantity only. Thus, each component of the system will have to be developed, tested and then produced in sufficient quantity to implement the 931 MHz system.

The nationwide paging system developed by applicants does not operate on the nationwide paging frequencies and thus avoids the above-mentioned drawbacks. The system of the invention basically permits connection of all of the presently existing local paging systems, i.e., radio common carriers or RCCs or wireline, by way of a satellite. Pages may then be broadcast in any of the major metropolitan areas of the United States using an existing local paging RCC. The system of the invention also permits customary local paging as well, using the same paging receiver.

In accordance with the present invention, the subscriber is assigned a paging telephone number in his home service area by the local RCC with whom he has contracted for service. When a caller wants to page this particular subscriber, the calling party dials the assigned telephone number using a standard DTMF telephone and is connected to an RCC site processor located in the same service area as the local RCC. Once the site processor has been accessed, the calling party relays a message or other information by use of the DTMF telephone or, in the case of alphanumeric data, by use of a standard ASCII keyboard with a CRT, personal computer, or similar device in conjunction with a telephone modem. Up to this point, the paging system on the invention processes both local and nationwide pages in the same manner. Means are provided, however, such that when a subscriber travels out of his local area, the system may be controlled to forward a *copy* of the subscriber's pages to another area. This is the nationwide paging aspect of the invention and these copies are referred to as nationwide pages. The system continues to broadcast the original pages locally even though the subscriber may already have left the area. Continued local broadcasting permits the subscriber to receive his pages up to the very moment he leaves the area. Such a feature is important since the subscriber is assured of receiving "that very last page". Thus the paging system of the present invention eliminates the problem of premature termination of local paging. Transfer of a copy of the subscriber's pages to another area is controlled in advance by the subscriber. Using a standard DTMF telephone, the subscriber merely inputs a special code that lets the RCC site processor know where a copy of the pages are to be routed. Incoming pages are then stored for a predetermined time to permit the subscriber to arrive at this destination and then are passed along to a local RCC which serves the new area for broadcast to the subscriber.

The RCC site processor stores a copy of each page that it processes for a predetermined time. Thus, during those periods when the subscriber is not available to receive pages, he does not have to worry about missing any pages. When the subscriber becomes available to receive pages, he merely informs the system that he wishes a rebroadcast of his pages. The system then passes along copies of any pages which were previously stored to a local RCC which serves the area where the subscriber is presently located for broadcast to the subscriber.

Where a nationwide page is to be sent, a copy of the original page is validated by the RCC site processor then routed via the most cost effective service (e.g., GTE TELENET telephone lines or satellite return link) to a traffic route processor located in a geographically convenient place. The traffic route processor receives packets of digital data (pages) from the various RCC site processors located around the country and temporarily stores this information in memory. The traffic route processor outputs the data to an uplink control processor which groups the page and/or data transmission requests into appropriate groups on a location and/or regional basis. Billing and other statistical data may also be compiled at this point. The digital data stream is then fed to a satellite uplink facility for transmission to a satellite. The data stream is then broadcast nationwide via the satellite. A nationwide network of telephone lines may also be used as an alternative to a satellite for distribution of the digital data. In each of the local cities participating in the system, the satellite downlink signal is received by a satellite receiver located at a receiver downlink facility at the same location as the RCC site processor for that city. The satellite receiver may be a direct broadcast (DBS) Ku-band receiver specially modified to receive digital data. The received data stream is input to a packet extractor which searches for address information unique to the local city. When local addresses are found, the packet extractor removes the data from the data stream and sorts it according to the local paging systems (RCCs) which will actually broadcast the paging information and then by subscriber.

A paging formatter then transforms the digital data received from the packet extractor into the proper format necessary to broadcast the paging information by the particular RCC or wireline. The paging formatter provides special coding on the transmitted signal which allows a subscriber's paging receiver to function on any of the frequency channels now assigned to local RCCs or telephone companies. The paging receiver may be a conventional paging receiver adapted with a scanning receiver module in accordance with the present invention. Thus, a subscriber has the ability to receive several nationwide pages while in a given geographical location but not necessarily from the same local RCC over the same frequency. This redundancy is designed into the system as a safeguard should a particular frequency not be available in a given city. Thus, the subscriber is assured that an alternate paging system frequency can be used. This system also permits use of the same paging receiver for every area of the country.

Applicants have also developed the electronic circuitry needed to convert a conventional fixed frequency paging receiver to a scanning receiver which scans across a plurality of paging frequency channels in any one of the paging frequency bands looking for paging information intended for a particular subscriber. A scanning type receiver is required because nationwide page information may be broadcast locally over any frequency available to broadcast the page. The same concept is applicable in other paging frequency bands. Therefore, a subscriber may receive a number of pages from different local RCCs, thus requiring a paging receiver which can tune all of the RCC frequencies in a given paging frequency band.

BRIEF DESCRIPTION OF THE DRAWINGS

FIG. 3 is an illustration of the paging record format which is created for each page processed by the paging system of the invention.

FIGS. 4 and 5 are more detailed illustrations of the paging record format for each page processed by the paging system of the invention.

DESCRIPTION OF THE PREFERRED EMBODIMENT

Figure 1:
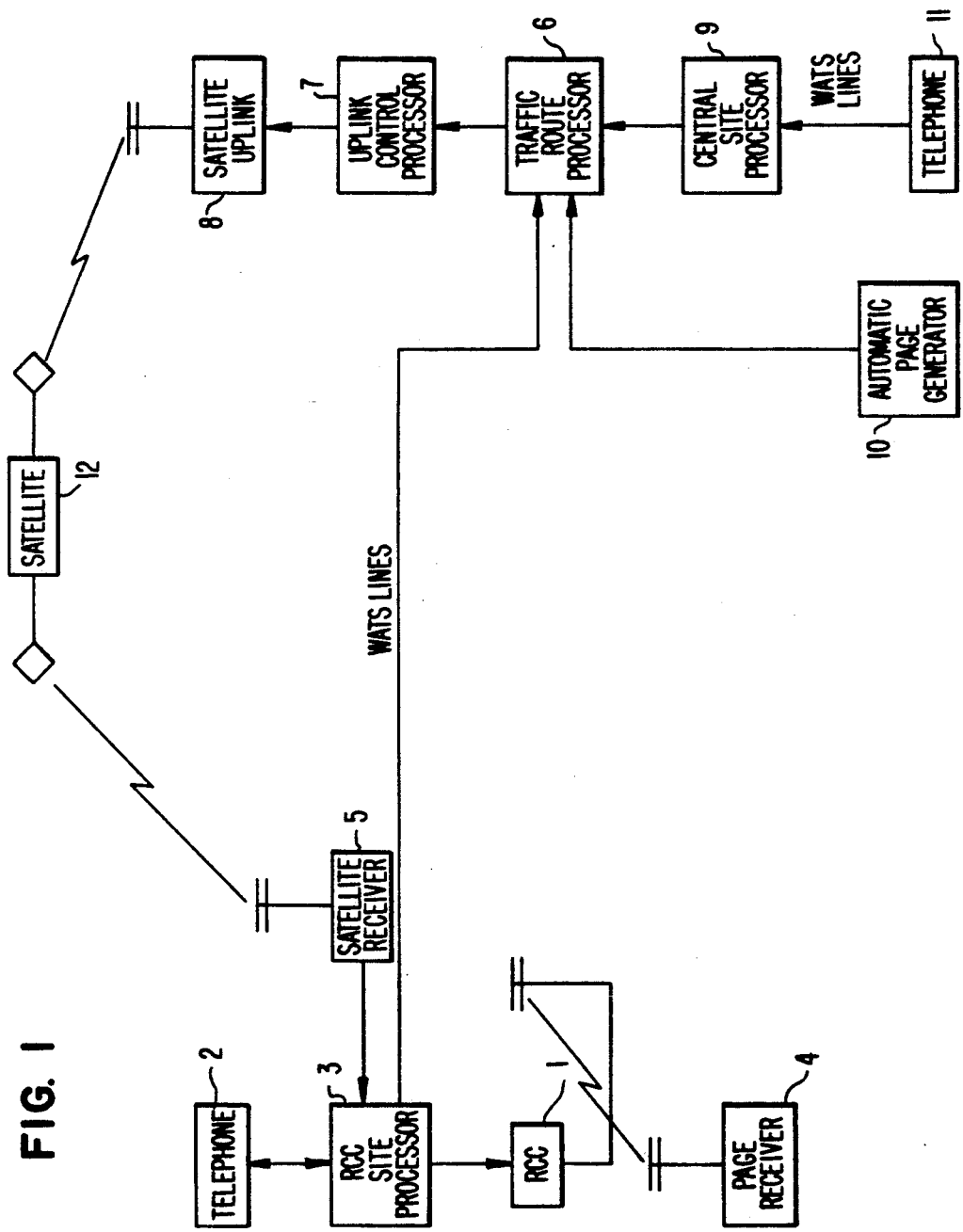
FIG. 1 is an overall block diagram of the paging system of the present invention.

A block diagram illustrating the wide area paging system of the present invention is set forth in FIG. 1. In accordance with the invention, each subscriber is assigned a paging telephone number in his home service area by the local RCC with whom he has contracted for service. As shown in FIG. 1, the local RCC is indicated by reference No. 1. When a caller wishes to page a particular subscriber, the calling party dials the subscriber's assigned telephone number using standard DTMF telephone 2 or a suitable device connected through a telephone modem and is connected to RCC site processor 3. Each service area served by the system of the invention is provided with its own site processor. The site processor is connected to all of the local RCCs in the service area and, as described below, may format a page request for broadcast by any RCC in its own local service area.

Once site processor 3 is accessed, the calling party enters the subscriber's paging receiver identification number using DTMF telephone 2. The calling party may also enter an alphanumeric message for the subscriber using a standard ASCII keyboard and CRT, personal computer, or similar device in conjunction with a telephone modem (not shown). For those calling parties not having access to facilities for entering alphanumeric messages, RCC 1 may be equipped with one or more operator consoles through which the calling party may request that an alphanumeric message be entered for the subscriber. Another alternative is to provide a console, modem and perhaps a printer to the subscriber for installation in his office. Office personnel could then originate the page and any alphanumeric message for the subscriber by typing in the message and pressing a "send" key. The console would be programmed to automatically dial site processor 3 to initiate the page and to send the alphanumeric message. Since many subscribers are likely to already have sophisticated computer systems, word processors or personal computers, such devices could also be used to initiate pages in much the same way as a dedicated paging installation. The required interface protocol would be provided to the subscribe so that his computer system could communicate with site processor 3.

When site processor 3 receives a page request, it must determine where the identified pager is located. If the pager is currently in the local service area, site processor 3 formats the paging information for broadcast in the local service area by local RCC 1. The page is then received by paging receiver 4 carried by the subscriber.

When the subscriber travels out of his local service area, the system may be controlled to forward a *copy* of the subscriber's pages to another area. This is the nationwide paging aspect of the invention and these copies are referred to as nationwide pages. The system continues to broadcast the original pages over local RCC 1 to which the subscriber is assigned even though the subscriber may already have left the area. Continued local broadcasting permits the subscriber to receiver his pages up to the very moment paging receiving 4 is out of range or RCC 1. Thus the paging system of the present invention eliminates the problem of premature termination of local paging.

Transfer of a copy of the subscriber's pages to another area is controlled in advance by the subscriber. Using a standard DTMF telephone, such as telephone 2, the subscriber merely enters a transfer code that lets RCC site processor 3 know where a copy of the pages are to be routed. As will be described below, a copy of the page request is then transferred to traffic route processor 6 for distribution to another subscriber service area for broadcast in accordance with the subscriber's request.

A copy of each page request received by site processor 3 is stored for a predetermined period. These page copies may be retrieved by the subscriber at any time during this period by merely accessing site processor 3 using DTMF telephone 2 and entering a rebroadcast code. Site processor 3 then causes the rebroadcast of any pages which were previously stored.

When site processor 3 determines that a page is to be routed to another service area for broadcast, a copy of the original page is validated by RCC site processor 3, i.e., checked for errors and corrected if necessary, then formatted into packets of digital information. The packets of information are routed via the most cost effective communication link (e.g., GTE TELENET for a satellite return link) to traffic route processor 6. Traffic route processor 6, along with uplink processor 7, satellite uplink 8, central site processor 9 and automatic page generator 10, is located in a geographically convenient place for all of the local site processors 3 in the system. Traffic route processor 6 receives the packets of digital data page requests and page messages from the various site processors 3 in the system, checks and corrects the data if necessary, then temporarily stores it for transfer to uplink control processor 7 at the appropriate time. Uplink control processor 7 groups the data into data packets on a location and/or regional basis. Billing and other statistical data may also be compiled at this time. The data packets are then transferred to satellite uplink 8 for transmission to satellite 12 for broadcast nationwide. The satellite downlink signal is received in each of the subscriber service areas by satellite receiver 5 located at a receiver downlink facility at the same location as RCC site processor 3 for that service area. Satellite receiver 5 may be a direct broadcast (DBS) Ku-band receiver specially modified to receive digital data. The received data packets are input to site processor 3 which searches for address information unique to the local service area for the particular site processor. When data packets with a local address are found, site processor 3 removes those data packets from the data stream and sorts them according to the local RCCs which will actually broadcast the paging information and then by subscriber. Site processor 3 then converts the received information into local transmission page format for forwarding to the appropriate RCC 1 for broadcast.

As shown in FIG. 1, the nationwide paging system of the present invention also includes automatic page generator 10. Page generator 10 maintains a list of events that could cause pages to be generated for a particular subscriber. These automatic pages fall into two categories: time initiated pages and even initiated pages. Time initiated pages are pages that must be broadcast at a specific time. Pages of this type include wave-up calls, birthday notices, reminders to take medication, etc. When the event time occurs, page generator 10 sends a page request to traffic route processor 6 for distribution via satellite 12 to the appropriate local service area for broadcast. Event initiated pages are pages that must be broadcast when an event occurs. For example, page generator 10 could be programmed to monitor the stock market "ticker-tape" telephone lines. When the price of a specified stock value changes by a certain amount, a page request could be generated announcing the change to the subscriber requesting the information.

The paging system of the invention also includes central site processor 9 which is very similar in operation to RCC site processor 3. However, central site processor 9 is connected to WATS lines rather than local telephone lines. The primary function of central site processor 9 is to allow remote programming changes of pager location. In those cases where a subscriber is already in a remote service area and wishes to route pages to another remote service area, the change can be effected by accessing central site processor 9 using any DTMF telephone such as telephone 11 shown in FIG. 1. Central site processor 9 also includes voice generation equipment to allow auditory verification of pager location changes. The voice generation equipment also has the capacity of prompting the calling party for the information required to effect a pager location change.

At least one of the local site processors 3 of the invention includes monitoring facilities. This particular site processor, hereafter referred to as the "monitoring site processor," has the capability of monitoring all other site processors within the system. Each site processor may be accessed by the monitoring site processor to obtain detailed status information. Each site processor also periodically sends a "page" through the system containing current status information destined for the monitoring site processor. In the event that an out-of-range condition occurs anywhere in the system, the site processor which detects the condition immediately notifies the monitoring site processor of the condition by accessing a local telephone line and dialing the monitoring site processor with a service notice. The monitoring site processor stores the service notice and the status information from each site processor for "trend analysis" in order to pinpoint potential service problems. The monitoring site processor can also initiate a partial or complete warm or cold start reset of any site processor in the system.

Figure 2:
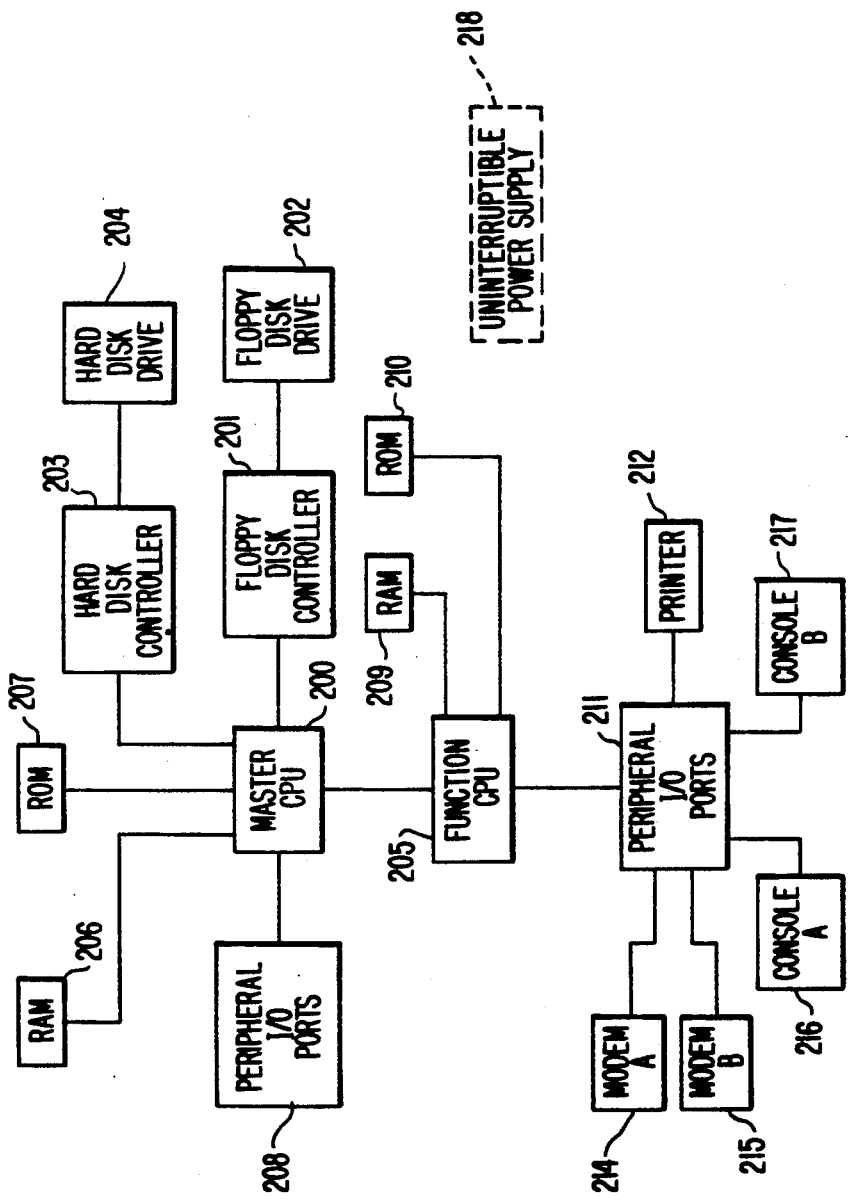
FIG. 2 is a block diagram of the computer system which comprises some of the elements shown in FIG. 1.

RCC site processor 3, automatic page generator 10, central site processor 9, traffic route processor 6, and uplink control processor 7 all comprise a computer system which includes a number of interconnected elements as shown in FIG. 2. Each computer system comprises master central processing unit (CPU) 200, floppy disk controller 201 and associated floppy disk drive 202, hard disk controller 203 and associated hard disk drive 204 and at least one function CPU 205. Floppy disk drive 202 and hard disk drive 204 provide mass storage and retrieval of utility programs and data. Master CPU 200 provides internal data transfer between all function CPUs (205) and controls floppy disk controller 201 and hard disk controller 203. Disk controllers 201 and 203 provide the control signals and I/O data path interfaces for floppy disk drive 202 and hard disk drive 204, respectively. Function CPUs (205) actually perform the work that the outside world calls upon the computer system to do such as the various functions performed by the site processors in processing a page request. Master CPU 200 merely supervises the operation of the function CPUs (205) and, in doing so, takes care of much of the routine housekeeping or so-called overhead for the computer system. Thus, function CPUs (205) can operate more efficiently in performing their assigned tasks.

As shown in FIG. 2, master CPU 200 also includes RAM memory 206 and ROM memory 207 wherein instructions and temporary data storage areas of a computer program reside and peripheral I/O ports 208 which allow the master CPU to communicate with the outside world. Function CPUs (205) also has its own RAM 209 and ROM 210 where instructions and temporary data storage areas of a computer program reside and peripheral I/O ports 211 which allow the function CPUs to communicate with the outside world as well through such devices as modems 214 and 215, consoles 216 and 217, and printer 212. Consoles 216 and 217 are interactive terminals which allow the computer system to communciate with a control operator. The computer system is electrically powered by uninterruptible power supply 218 shown in phantom in FIG. 2. Power supply 218 maintains operating voltage to the computer system in the event of a local power outage. It also prevents damaging power line transients from reaching the computer system. Power supply 218 includes sufficient battery backup to operate the computer system for up to 15 minutes. This length may be increased if necessary by providing additional battery packs.

The wide are paging system of the present invention requires generation and internal storage of at least one paging record for each page processed by the system and a paging record control block. Paging records and paging record control blocks are the primary data files used by the various function CPUs. A paging record contains information pertinent to the page it represents in a format that can be used by each element of the system and which can be deciphered into a 'Page Record Line' for output on a printing device. The paging record format of the present invention is shown in FIG. 3. As shown, the format provides a number of data blocks for each page including packet identification, package routing control, sortable date and time tracers, pager account identification, data type identification, send verification, data block integrity verification and variable length messages. All of this information is stored in each page record.

Figure 4:
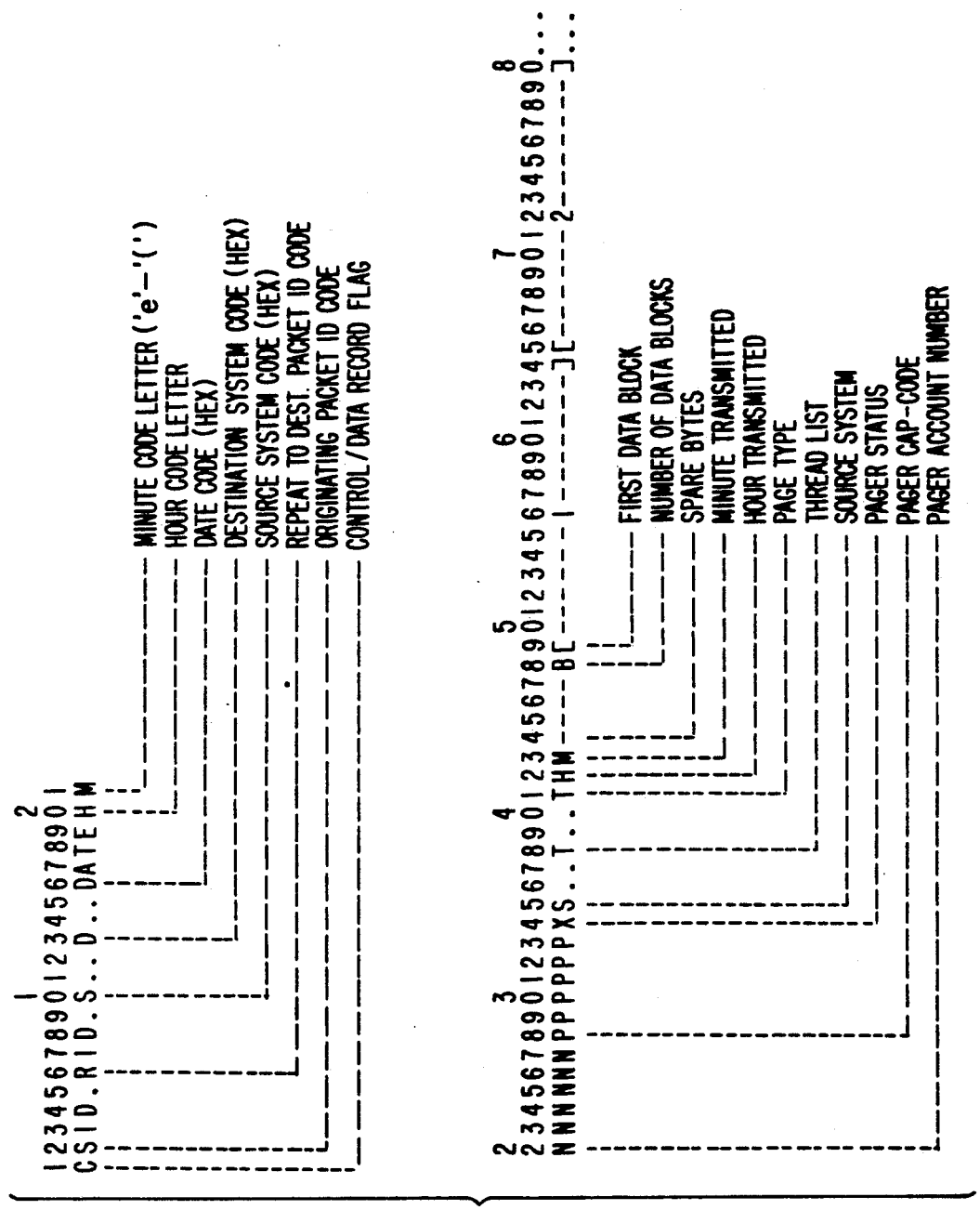

The first 32 bytes of each page record contain the control information which controls processing of the page through the system. The page record format is shown in FIG. 4. The various bytes are described below with the byte number or range of bytes in parentheses.

CONTROL/DATA RECORD FLAG—(1)

This byte is set to the ASCII character ' ' (5 EH) to indicate the start of a 128 byte record if the first 32 bytes contain control information. Any other character defines the record as a continuation of a previous data record. If there are less than 96 data characters in the message, there will be no continuing data records. If there are more than 96 characters in the record, there will be continuing data records containing up to 128 data characters per record. The ' ' character is the only character that may not be used in any data message.

ORIGINATING SYSTEM PACKET ID CODE—(2-5)

These four bytes contain a hexadecimal (0000-OFFF) packet ID code. Each packet of data sent to the local control groups or the master control group is ID coded sequentially. If a control group receives a packet that has a higher ID code than expected, it will request a repeat of the missing packet(s). If an additional data record is required for the message data, the second data record is assigned the next packet ID code. When the value exceeds OFFFH, the ID code rolls-over to 0000H. This allows tracking up to 4096 records.

REPEAT TO DESTINATION PACKET ID CODE—(6-9)

These four bytes contain a hexadecimal (0000-OFFF) packet ID code. Each packet of data sent by a control group to another control group is ID coded sequentially. The destination control group has a separate counter. If the destination control group receives a packet that has a higher ID code than expected, it will request a repeat of the missing packet(s). If an additional data record is required for the message data, the second data record is assigned the next packet ID code. When the value exceeds OFFFH, the ID code rolls-over to OOOOOH. This allows tracking up to 4096 records.

OWNER SYSTEM CODE—(10-12)

These three bytes contain the hexadecimal value of the source system (RCC cite location) where the page originated. Three bytes allow up to 4096 source locations (OOOH-FFFH).

DESTINATION SYSTEM CODE—(13-15)

These three bytes contain the hexadecimal value of the destination system (RCC cite location) where the page is to be transmitted. Three bytes allow up to 4096 destination stations (OOOH-OFFH).

To preserve space in the data records, day, month, and year are encoded in a four byte hexadeciminal form, while the hour and minute information is encoded into letters. The ASCII letter ' ' is the starting point for all letter codes. The letter ' ' is equal to '0' in the case of hours and minutes. The date code starts with day 1 (OOOO1H) equal to 01Jan48. This format allows very specific definition of a date and time in only six bytes.

All time references internally are based on Greenwich Mean Time, the international standard. Externally, all time references are based on local time, as defined by the system location. This eliminates ambiguities associated with the different time zones.

DATE CODE—(16-19)

The date code is a four byte entry representing an integer in hexadecimal. Day 0 is 31DEC47. The Date Code is the day the page originated.

HOUR CODE LETTER—(20)

The hour code letter is the hour the page originated (' ' to 'W'').

MINUTE CODE LETTER—(21)

The minute code letter is the minute the page originated (' ' to ' ').

PAGER ACCOUNT NUMBER—(22-27)

The pager account number defines the 'look-up' account record which contains the Pager Cap Code (described below) and other information (see Account Record Information). The range of this number is 000000 to 999999. Hex characters A-F may also be placed in the Cap Code, allowing 16,777,200 possible Cap Codes to be handled by the system. Each RCC Site System has a look-up file containing the Cap Code of every pager in the system. When a packet data is received and formatted by the site procesdor, the site processor looks up the account number, obtains the Cap Code and transmits the page.

PAGER CAP CODE—(28-22)

The Pager Cap Code is the unique identifier which causes the local site processor to generate a specific bit pattern for transmission on the RCC transmitter to set of a pager. The normal Cap Code contains the numbers 0-9, but the system will allow full hexadeciminal 0-9, A-F entry. These codes are not defined in POCSAG, and may therefore be used by any other process in the system.

PAGER STATUS—(34)

The pager status is not fully defined. The presence of a '0' as the pager status code will, however, inhibit any paging activities regarding this pager account, and an 'Invalid Pager Number' error will be displayed.

SOURCE SYSTEM—(35-37)

The source system code identifies the local RCC where the current Page Record originated. (See Owner System)

THREAD LIST—(38-40)

The thread list is used in local systems to keep track of pages to the same pager account numbers in the local current page buffer. It is always set '000' by the site processor for transmission to network systems.

PAGE TYPE CODE—(41)

This byte defines the type of data stored in the data blocks. The code is a letter, starting with the character '0 '. The currently assigning paging codes are:
O: None—No data is stored in the data records
A: Numeric—Numeric only data is stored
B: Alphanumeric—Alpha and numeric data is stored
C: Update—Changes to Pager Control Block File
D: Time Set—Periodic clock set for all systems

HOUR PAGE SENT—(42)

This byte contains, after transmission of the page at the terminating site, the Hour Code letter of the hour the page was sent.

MINUTE PAGE SENT—(42)

This byte contains, after transmission of the page at the terminating site, the Minute Code letter of the minute the page was sent.

NOT USED—(44-47)

This range of bytes is presently not defined.

NUMBER OF BLOCKS—(48)

This byte contains the nunber of data blocks in the record. The starting point is '0' (30 h).

DATA BLOCKS

The subsequent data blocks are 16 bytes each. For numeric data blocks, normally only one block is required. For alphanumeric data blocks, any number of blocks may be appended, up to the range of the data block character, which is ' ' (7 Eh), or 78 data blocks. Thus, an alphanumeric message for the subscriber may contain up to 1248 (78*16) characters. Five data blocks, or 80 characters, reside in the first record, and will suffice for most alphanumeric messages.

Each record is sent from one station to another station over whatever medium is available. Due to the 'printing' nature of the data record, simple monitors may be attached to the transmission link at any point to determine if data integrity is being maintained.

If a data block contains fewer than the maximum number of characters expected (16), then the data block is filled with null characters (00H). A complete data block of 16 bytes is always transmitted if there are any characters within the block.

The Pager Control Block is the primary file which controls all pager activities. It is located in every system, and is the same in all systems, each change to the pagers control block file (except record pointer changes) forces a national update of all pager control block files. Each record in the Pager Control Block is eight bytes in length. The format is shown in FIG. 5.

P1-P6—Pager Cap Code in modified BCD format (O-F)
A1-A3—Owner system. The system to receive accounting records when a page is placed to the pager.
ST—Status and Control characters.
L1-L3—Current Location System of the Pager.
R1-R3—Last Page Record Processed locally for their Pager The Data Record is the method used by the system to transfer all data within the system. The type identifier is utilized to identify the type of data in the record. This allows files to be up-dated to all systems from the Uplink at the same time.

Figure 6:
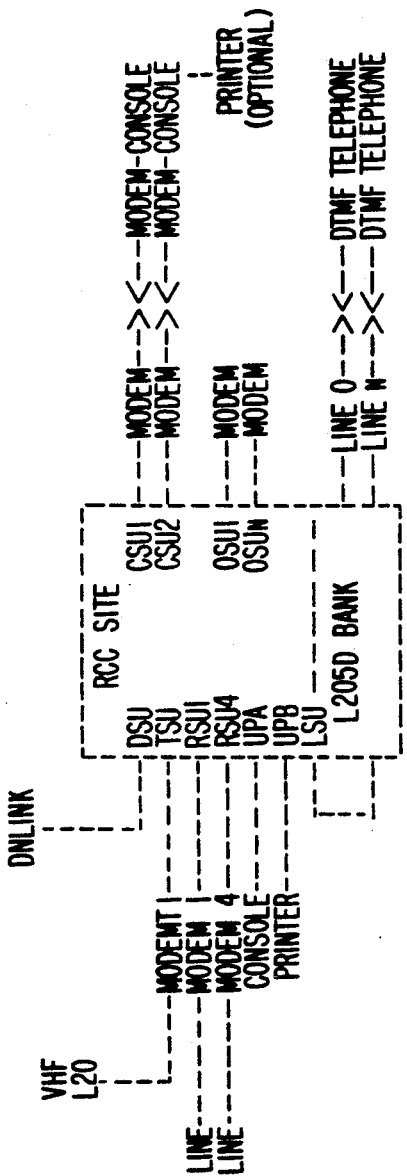
FIG. 6 is a more detailed illustration of the RCC site processor shown in FIG 1.

FIG. 6 is a further illustration of RCC site processor 3 shown in FIG. 1. As described above and shown in FIG. 2, site processor 3 is a computer system which performs a number of functions with a plurality of function CPUs (205). Each function is labelled in FIG. 6 to identify a particular function CPU within site processor 3. As shown in FIG. 6, and in conjunction with FIG. 1, the DownLink Service Unit (DSU) function CPU is connected to the output of satallite receiver 5. The DownLink Service Unit is actually two to four units. The two units work in conjunction with each other, and cross monitor receiver 5. Only one of the units is on-line at any given time.

One DownLink Service Unit constantly monitors the data flow from the satellite. When a data record address is "all" or when the correct system address is decoded in either the source or destination system field, then the receiving DSU signals the next DSU to begin decoding, stores the current record, and ceases monitoring the data flow. The received record is checked for accuracy, corrected if necessary, the "stored" for processing by the TSU, and an "event" code is sent to the TSU. Where data records are involved, a Data File Follows record is sent by up-link controller 16 followed by up to 32,768 bytes of data. The DSU decodes and stores the block of data in the appropriate data file at the location specified in the DATA FILE FOLLOWS Page Record. No actual pages will be sent during the period that a data file transfer is occurring to any RCC site. All RCC site processors may receive the same data file at the same time by using the 'All Call' destination address. Additional functions performed by site processor 3 are set forth below.

TSU—Terminal Service Unit

The Terminal Service Unit provides the interface to the area RCC transmitter(s) it controls. When an 'event' signal is received from the DSU, the TSU gets the paging record from the PAGREC file, checks to see if any records are missing (generating a RSUERR FIFD record for processing by the RSU if so) obtains and processes the page record. The TSU loads until one of several conditions occurs. If the paging block becomes full, or 'MAXTM1' elapses prior to the filling of a paging block, then the paging output sequence will begin. On completion of the paging output sequence, the TSU writes a 'page complete' record to the ASU FIFO for accounting functions.

RSU—Remote Service Unit

The Remote Service Unit provides modem connection to other 'system' sites, using the PAGREC format. System routing is accomplished by the programming of the 'dial' number. When a page or data record is queued for output of the 'system' the local modem is activated. The appropriate 'system' number is dialed, and the data is transferred to the remote device. XON/XOFF handshake is provided. Complete Data Files may be transferrd between machines by the RSU, using a data file transfer format.

LSU—Line Service Unit

The Line Service Unit controls a bank of interface circuits for telephone input of numeric only pages. The interface circuits are polled, with periodic output of paging records to the PAGREC file.

CSU—Customer Service Unit

The Customer Service Unit provides remote page entry and look-up at 300 or 1200 baud using a modem. The CSU provides two ports per slave. The accessing device or user identifies itself at the onset of the session, then may enter a page or interrogate the current page list for previous pages to a given account. System and user ID's are required for operation. The following functions are provided:

MANUAL PAGE ENTRY—If the calling device provides a 'manual flagged' access ID, then the calling device will be prompted based upon the device type. Screen formatting is provided this way. Each 'manual' device type has a unique identifier to allow the module to send the correct control codes to perform screen formatting for that type device. If the module has no instruction set for that device, then the default 'question/answer' mode will be used. This is most applicable to 'dumb' termination operations.

AUTOMATIC PAGE ENTRY—If the calling device provides an 'automatic flagged' access ID, then the subsequent data will be assumed to be pre-formatted and no prompts will be issued. The calling device may then enter up to sixteen pages in the PAGREC format. The date and time data is not provided by the accessing unit. On completion of the data input, the CSU will disconnect.

PAGE LOOK-UP—Look up of pages previously processed is provided. If the calling device is manual, then the caller will be prompted for the look-up information. If the accessing device is automatic, then the lead-in code will request the loop-up of previous pages. The Pager Control Block and all stored pages will be output to the accessing device. If 'manual', then the CSU will pause following each screen of data and await a prompt from the calling party to display the next screen.

OSU—Operator Service Unit

The operator Service Unit runs in slave with both serial ports connected to 'consoles'. Each port may be connected to a modem for off-site operation at 1200 baud, or to a local console for on-site operation at 9600 baud. The basic functions of the OSU are:

(START-UP)—Local consoles will be assumed if no operator dial number is provided, and default baud rate will be 9600. If an operator dial number is provided, then the module will attempt connection to the operator port until connection is made. Operator port Baud rate will default to 1200 baud, but 300 baud may be selected.

MEMU—Once a connection is established, a menu will be displayed, and the operator will be prompted to select one of the following functions:

PAGE ENTRY—Manual Page Entry—

LOOK-UP A PAGER—Looks up and displays the basic control information for any pager on the system. This includes the Cap-Code, the Owner system, the Current Location system, and previous pages to the pager (local or nationwide).

CHANGE PAGER LOCATION—Looks up a Pager Control Block, and allows the destination system address to be changed. This requires only that the operator knows the area code and one exchange of the destination city. The destination system is the determined by the system and the city name is displayed prior to termination of the sequence.

Figure 7:
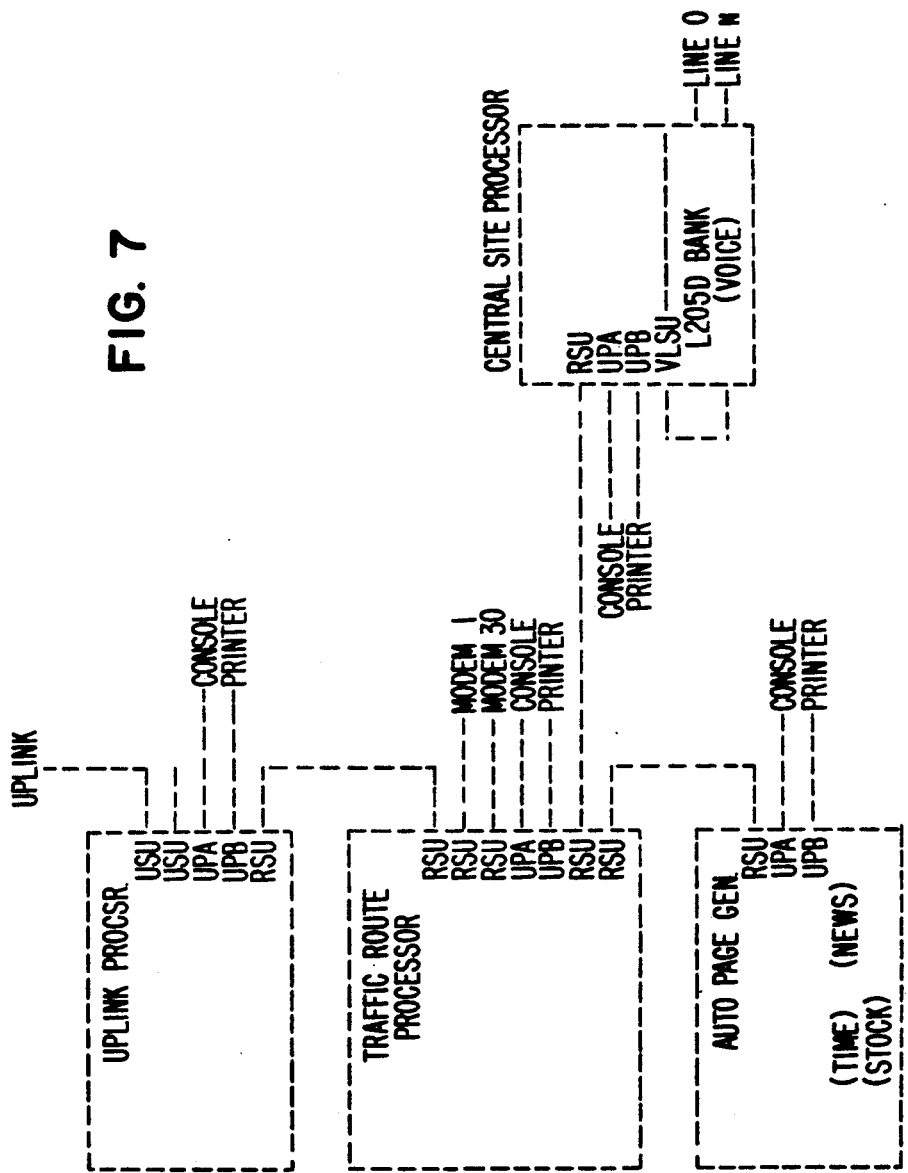
FIG. 7 is a more detailed illustration of the up-link processor, traffic route processor, automatic page generator, and central site processor shown in FIG. 1.

FIG. 7 is a further illustration of uplink control processor 7, traffic route processor 6, automatic page generator 10 and central site processor 9 shown in FIG. 1. In addition to the above-described functions, the following functions are provided by function CPU's in these computer systems.

VLSU—Voice Line Service Unit

The Voice Line Service Unit is similar to the LSU Line Service Unit. It has the additional capability of voice generation to provide automatic prompting to the accessing customer for Pager Address Location Changes.

Two methods of voice generation may be used. In one, a 'phonetic' voice synthesizer is used, in the other direct voice storage and recall is used.

The 'phonetic' synthesizer requires much less processor overhead than the direct storage approach. The appropriate 'phonemes' are selected to provide the words, stored in the hard disk, and output at the time required.

In the 'direct' voice storage method, each voice message is recorded locally, stored on a hard disk, and provided to one of eight voice generator circuits. When a voice message is required, the TSU obtains the voice data from the hard disk and outputs it to the voice generator.

SSU—Status Service Unit

The Status Service Unit constantly checks the operation of all other units in the system, and connects to a console for display of the system status. Its console data may be routed to either its local console (defaults), or on access by the central monitoring facility, it's console data may be routed over the modem line to the central monitoring facility. All function CPUs in the system generate periodic 'ticks' and send a status message to the SSU at a pre-determined interval (e.g., five seconds). If the SSU fails to receive a 'tick' from a particular function CPU, it sends an 'interrogation' to that function CPU, which, if not returned within five seconds, will cause 1) a message to the monitoring site processor that a failure has occurred in the faulty function CPU, and 2) a re-boot (total reset) of the affected function CPU. The SSU also outputs 'ticks' to an external device which is capable of performing a complete local system hardware reset. If the SSU fails to tickle the hardware device within thirty seconds, the hardware reset is initiated.

The SSU maintains a log of the status of each function CPU. If one function CPU becomes backlogged, it can assign another function CPU to the backlogged function. Any inequity between the function CPUs is flagged and output to the monitoring site processor.

The SSU also monitors the external hardware monitoring device, and periodically generates 'status' pages to the monitoring site processor via the national network.

ASU—Accounting Service Unit

The Accounting Service Unit receives the 'page complete' record from the TSU and updates the appropriate account file. On completion of the update, the ASU sends an 'accounting complete' record to the RSUACT FIFO for later (polled) transmission to the master system. It is typically multiplexed in with an SSU.

DBU—Data Base Unit (optional)

The Data Base Unit provides complete control of the data records pertaining to each account and pager. It allows up to 255 data bases per logical drive partition, up to 1,048,580 records per data base, up to 255 elements per data data record, and up to 255 data characters per element. High-speed indexing and loop-up may be performed based on any of the data elements within the data base.

A page request is processed through the system in the following manner. For numeric only pages, the subscriber places a numeric only call by dialing the local access line assigned to that pager and inputting 1) the desired pager number, then 2) the desired display data (if any).

The local system RCC site processor receives the call request, then determines where the pager is located (station address). If the pager is currently located within range of the local station, the local system processes the call locally, and stores a Page Record for later transmission to the traffic site processor for billing control. If, however, the pager is not located within range of the local station the local system generates a Page Record for immediate transmission to the traffic route processor.

Pages containing alphanumeric data (letters A-Z, numbers, and punctuation) require a different method of input to the system since this information is not possible to input using a standard 'touch-tone' telephone. Four methods are provided:

Local Operator—The RCC may have one or more 'Operator Consoles' installed at the RCC site. Since most RCC's provide answering service to their customers in conjunction with paging, this should not present a problem. The person placing the page (caller) dials the local number of the answering service and requests a page. The operator places the page by inputting the pager number and the alphanumeric data message via an operator console. The system then processes the call. The local operator is connected to the RCC site processor through the OSU.

Encoder—An Encoder device comprised of a console, modem, and possibly a printer, is supplied to the user for installation in his office. The user's officer personnel would originate the page by typing in the message and pressing the 'send' key. The Encoder then dials the local modem access line of the local RCC, or the 800 service number (if provided), and sends the call request to the local RCC. The system then processes the call. The Encoder connects to the RCC site processor through the CSU Module.

Computer Interconnect—Since many users of the system would already have sophisticated computer systems, word processors, or personal computers, these devices would be allowed access to the system to facilitate page processing. Operation would be similar to operation under 'Encoder'. The interface protocol would be provided to the user so that the user's system could be programmed to communicate with the RCC site processor. The computer interconnect connects to the RCC site processor through the CSU.

Automatic—Automatic pages could be placed by the system itself signalling an 'event occurrence'. The system may be connected to one or more news wire services and stock exchange wire services. The user would request, for instance, a page in the event a word or combination of words appears on the wire service, or in the event of a stock value change in exces of a requested amount, or at a predetermined date and time. When the event occurs, the system places the page. Also, time sensitive events like birthdays could be programmed in advance. On the desired date the pre-programmed page would be placed. The automatic pages are generated in automatic page generator 10 which connects to traffic route processor 6 via an RSU.

Repeat—In the event that the user feels that he has missed a page for any reason, he may dial into the local RCC and, using a special access code, request that all of his pages be repeated. This would be valuable since the pager would probably be incapable of receiving pages in an aircraft traveling between two service areas. The stored pages would be repeated sequentially in order of occurrence.

After a page request is made as described above, it is processed through the system in the following manner. As also described above, each page request generates a Page Record. The Page Record is standard throughout the system, and contains the necesary information to process the page throughout the system. The Page Record is processed locally for local pages by the RCC site processor.

Nationwide pages are processed through the remotely located traffic route processor. When a page request is made, the local RCC site processor seizes one of its Remote Data Lines and dials into one of the lines connected to the traffic route processor. These lines may be a bank of national and state 800 numbers in rotary configuration, or a series of data lines provided by a data service, such as GTE telenet. The traffic route processor answers the call and inputs the Page Record. Included in the Page Record is the current pager station address, programmed by the user on the local access lines using a 'touch-tone' telephone. The traffic route processor receives the Page Records, checks and corrects it, stores it, then forwards it to the uplink controller.

The uplink controller assembles the Page Records into a data packet which is transmitted by the Uplink equipment to the satellite along with all other 'current' Page Records. The satellite receives the data packet and repeats it to all RCC Site Processors simultaneously. Each RCC Site Processor extracts the page and data packet(s) intended for it from the data packet stream, converts the received page record(s) into local transmission page format, then forwards the formatted page data to the TSU for output on the local transmitter.

The TSU handshakes with other control equipment working with the local RCC transmitter, and then transmits the local page over the RCC transmitter when a time slot becomes available. Thus, the page is completed.

Where a pager location change is desired, the user dials into the local system operator (if provided) who selects the 'Change Pager' function on the local console of the RCC site processor. The change pager function prompts the operator for the information pertinent to the change and the operator asks the user for the information, then inputs it to the system.

Where the subscriber is already in a remote location and wishes to transfer his pages to another service area, he dials into the central site processor and is prompted for the function he desires. He inputs his pager number and the area code and exchange of someone he is going to visit in the destination city. The central site processing responds with the city name (for handshake) and the level of coverage in the area. The user also is prompted for the pertinent times of service, or an itinerary may be programmed weeks in advance if the desired.

The local station address is defined by a number of six digit identifiers, the six digits are the local station's site address and consist of the area code and all exchanges served by that RCC site processor. All local stations have a 'look-up' table of all exchanges where nationwide paging service is provided. This simplifies the system for the user. Since he probably knows the number of someone in the city he is going to visit. Ideally, the user would input a 'number where he can be reached' in the city he is going to. If service is not provided in that exchange, then the system can immediately notify the user. The user can then decide whether to 'turn-off' his pager by inputting an area code/exchange of '000000'. This will prevent 'missed pages' from occuring without the user knowing in advance that he will be unable to receive the page, and it will prevent the user being billed for pages he did not receive because of national paging system limitations. In the event that more than one RCC Site Processor serves the same exchanges, the Traffic Route Processor will alternate the transmission between the RCC's to provide equal air time utilization.

Paging receiver 4 shown in FIG. 1 is a conventional paging receiver which has been modified in accordance with the present invention to permit scanning of the RCC frequency channels. Such a conventional receiver can be selected from amoung a number of receivers known in the art including receiver model number D-4-ALPHA manufactured by NEC. The NEC D-4-ALPHA pager is an FM-FSK alpha-numeric pager capable of receiving a single modulated carrier. In order to conserve battery life, certain sections of the pager's subsystems are turn off for a majority of the time and turned on only when absolutely necessary. The turn-off period (hereafter referred to as "sleep") is controlled by a "watchdog" timer resident in the pager's VLS1 components. The sleep-awake duty cycle is arranged so that the pager is given ample opportunity to recognize an incoming page while maximizing battery power conservation. An example of a typical page acquisition sequence is shown in FIG. 8.

Figure 8:
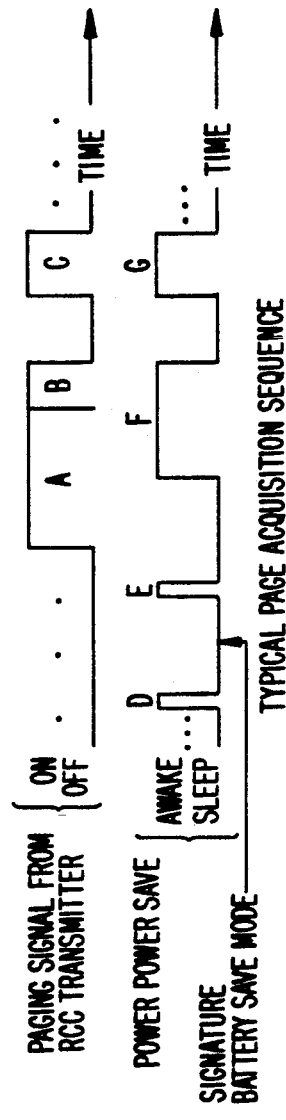
FIGS. 8–14 illustrate various signals and circuit diagrams associated with the scanning receiver of the present invention.

The upper half of FIG. 8 represents the signal transmitted by the RCC. Section A is the page preamble (typically a single tone) which precedes all paging messages. The purpose of the preamble is to cause all receiving pagers to awaken and begin looking for the synchronization codework (B) which identifies uniquely the pager which is being signaled. In addition to this function, the synchronization codeword also specifies the time domain location of the message packet C.

The lower half of FIG. 8 represents the pager÷s power save response to the transmitted signal. The two short duration pulses (D, E) represent the normal sleep process the pager uses to conserve batter life. Should the preamble (A) be present while the pager is awake, the RF power save signal maintains the pager in an awake status in synchronous with the synchronization codeword (F) and subsequently message packets (T, etc.). Should the pager fall to recognize the synchronization codeword (as would be the case during periods of heavy radio interferences, a weak signal or an invalid synchronization codeword) or message packet, the pager returns to the normal sleep-long/awake-short battery save status.

Figure 9:
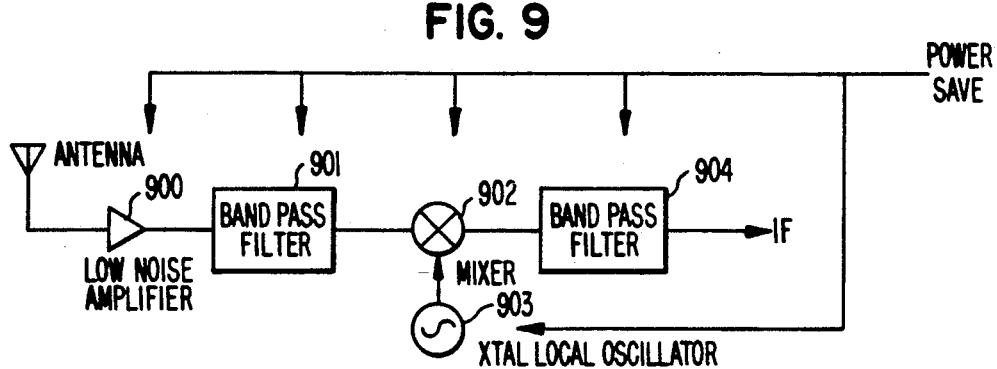

Among the pager subsystems which are slaved to the power save awake/sleep cycle is the RF 'front end." This section of the pager is shown in FIG. 9.

The receiving stages of the pager are implemented as simply as possible while maintaining high selectively and sensitivity. Low noise amplifier 900 is a single stage RF transistor amplifier. Band pass filter stage 901 is a cascade of factory tune "tank" circuits. The first IF (21.4 MHz) is obtained from a downconverter made up of band pass filter 901, local oscillator 903 and mixer 902 and band pass filter 904. Mixer 902 is a BJT (bipolar junction transistor) mixer which is biased for nonlinear operation. Local oscillator 903 is a fixed frequency crystal oscillator which supplies the down conversion frequency. It is local oscillator 903 which is replaced by a scanning local oscillator module in accordance with the present invention. The pager IF is subsequently passed to the FM discriminator (not shown) for demodulation. In order to turn the front end on and off (awake/sleep), the RF power save signal from the NEC VLS1 circuit drives the base of a switching transistor. The transistor switches the DC supply voltage rail to the elements shown in FIG. 9.

Modification of the receiver to permit reception of any of a plurality of separate RF signals can be accomplished in accordance with the present invention with little modification to the original pager design. Further, the useful battery life for the modified pager should be no less than 150 hours using a size "AA" alkaline 1.5 volt cell. Lastly, the original design performance specifications of the pager are maintained.

Figure 10:
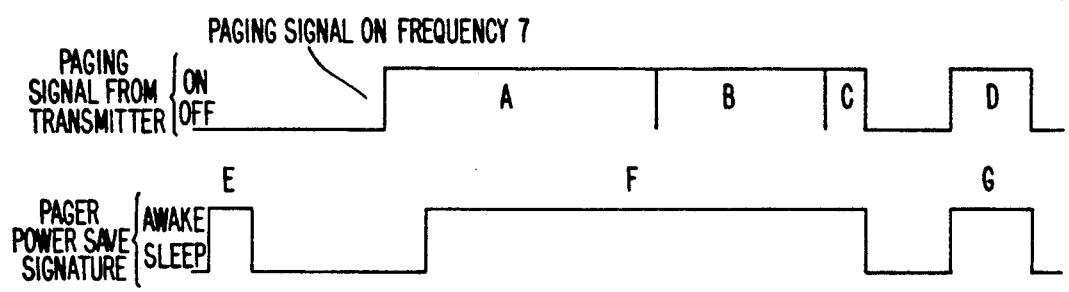

The sleep/awake signature of the modified pager and RCC transmitted signal is discussed in FIG. 10. The upper half of FIG. 10 represents the signal transmitted by the RCC. Section A is a special preamble unique to the RCC's which support the scanning pager network. This preamble is a single tone (alternating 1, 0 bit pattern) of a duration sufficiently long for a pager to completely scan all frequencies at least once. Sections B, C and D are the page preamble, synchronization codeword, and message packet, respectively. These last 3 sections are the same as their counterparts in FIG. 8.

The lower half of FIG. 10 represents the modified pager's response to the transmitted signal. The awake period E is the period of the preamble search at each frequency. In the above example, the special preamble A is searched for and not found until frequency #7 shown in Table 1 for example is reached by the pager. At this point, the pager remains awake through periods F and G and subsequent message packets. Table 1 is a listing of several frequencies in the VHF band which the pager of the invention can scan. This list is by no means inclusive and is presented by way of example only. Moreover, the pager of the invention may also be used to scan a plurality of frequencies in other bands as well.

Figure 11:
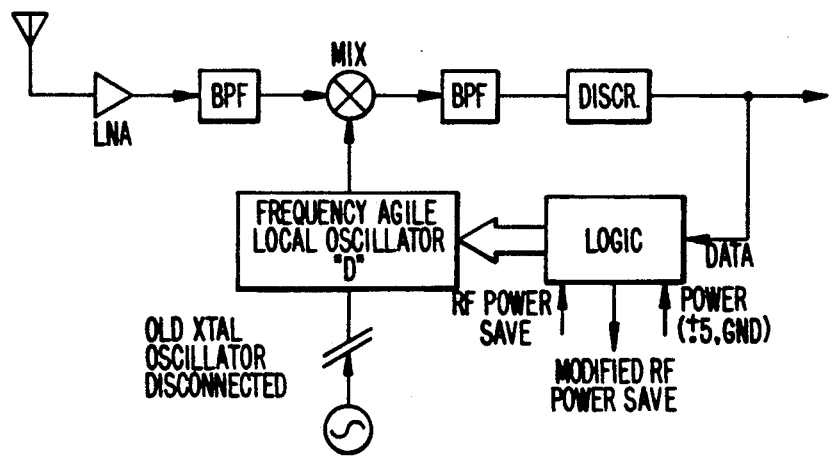
Figure 12:
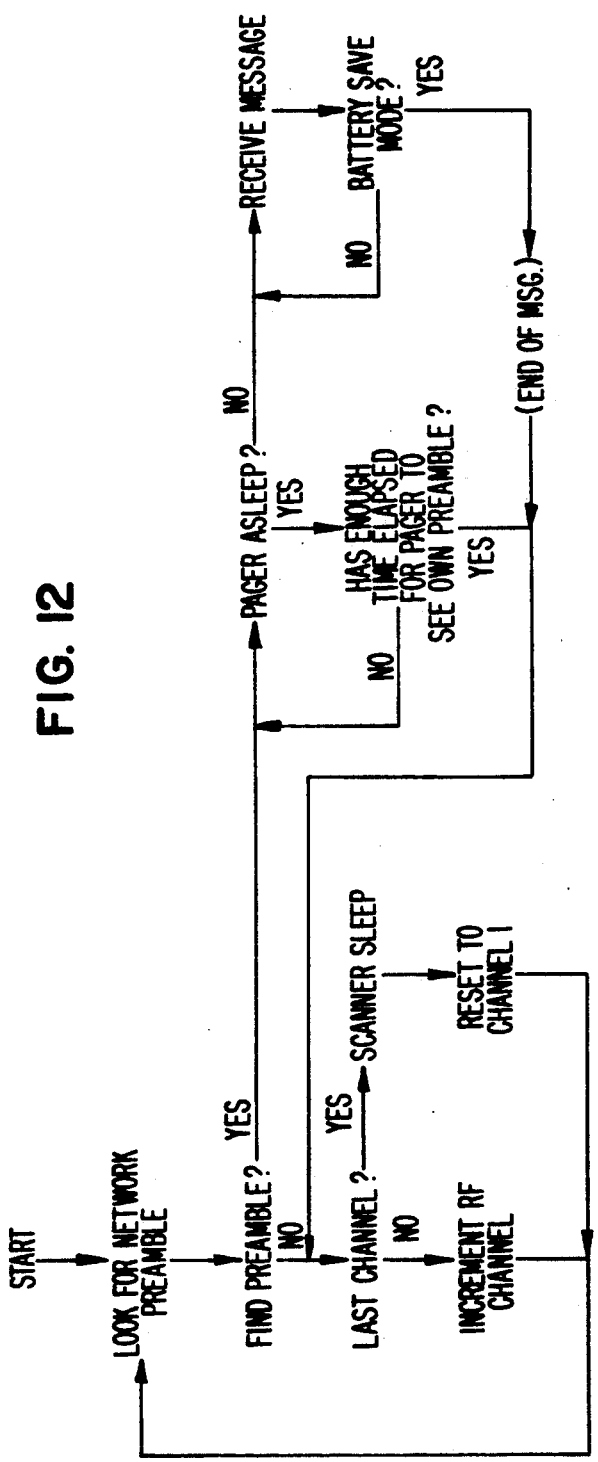

In order to scan all twenty-two frequencies, the conventional fixed frequency receiver is modified as shown in FIG. 11. The pager's crystal local oscillator is electrically disconnected and replaced with frequency agile local oscillator 950 and associated logic circuitry 951. The local oscillator frequency is chosen so that the difference frequency between the local oscillator and RD is 21.4 MHz when the RF/LO frequency number are correlated. Logic circuitry 951 uses the flowchart shown in FIG. 12 to control the LO frequency based on the pager's status (i.e., awake, sleep, preamble detect, etc.).

Figure 13:
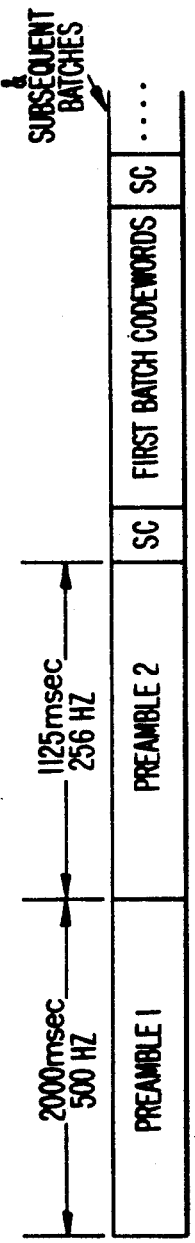

A transmission consists of two preambles followed by a batch of complete codewords, each batch beginning with a synchronization codeword (SC) (see FIG. 13). The first preamble allows for frequency synchronization by the receiving pagers. This preamble is a sequence of logic reversals, 101010 . . . repeating for a period of at least 1200 msec. The preamble frequency is, for example, 500 Hz.

The second preamble is transmitted for pager bit synchronization which also allows for word synchronization. This preamble is a pattern of logic reversals, 101010 . . . repeated for a duration of 1125 msec. One example of a preamble frequency is 256 Hz but other frequencies may be used as well.

TABLE 1

| Channel No. | RF Freq. (MHz) | LO Freq. (MHz) | IF Freq. (MHz) |
|---|---|---|---|
| 1 | 152.03 | 130.63 | 21.4 |
| 2 | 152.06 | 130.66 | 21.4 |
| 3 | 152.09 | 130.69 | 21.4 |
| 4 | 152.12 | 130.72 | 21.4 |
| 5 | 152.15 | 130.75 | 21.4 |
| 6 | 152.18 | 130.78 | 21.4 |
| 7 | 152.21 | 130.81 | 21.4 |
| 8 | 152.24 | 130.84 | 21.4 |
| 9 | 158.70 | 137.30 | 21.4 |

Figure 14:
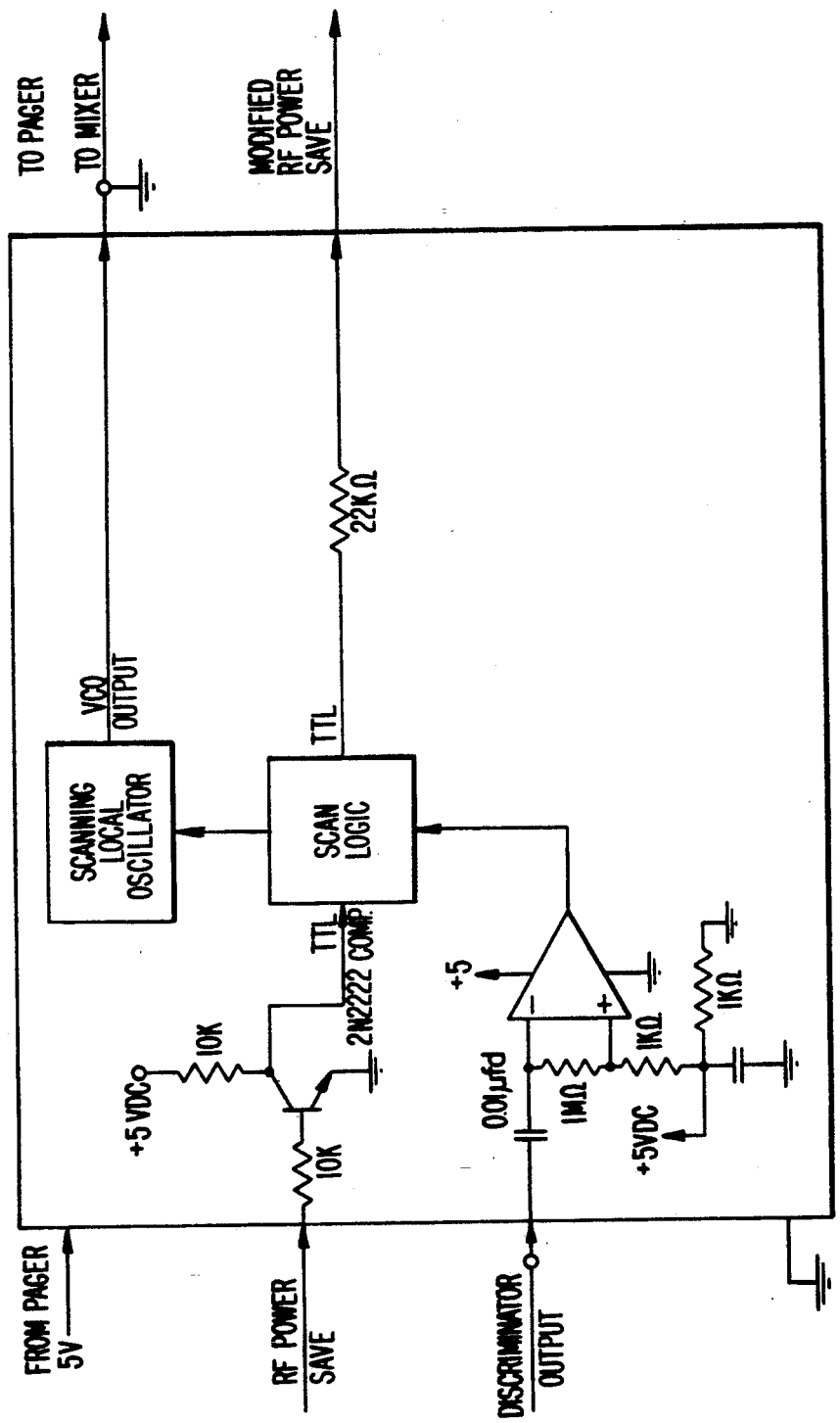

As shown in FIG. 14, there are six points of interface between the module of the present invention and the paging receiver. The scanning receiver module is required to perform the following functions:

1. Receive the RF power save from the pager and determine if the pager is in the batter save mode or receiving messages.
2. Receive the pager discriminator data and determine if a valid preamble-1 has occurred.
3. Provide the necessary control signals to the scanning local oscillator section to set the frequency.

The following tables 2-11 more detaily describe the processing of a page through the paging system of the present invention under various conditions.

TABLE 2

NUMERIC CALL-AUTOMATIC DTMF-LINE-LOCAL RCC SITE PROCESSOR

| | |
|---|---|
| LSU | WAIT STATE polls all idle lines for ring voltage detection periodically sends 'tick' to SSU |
| User | Dials local line and connects to one of the 'LINE n' |

TABLE 2-continued

NUMERIC CALL-AUTOMATIC DTMF-LINE-LOCAL RCC SITE PROCESSOR

| | |
|---|---|
| | inputs |
| LSU | Detects ringing on line |
| | Siezes line |
| | Gives Dial Tone |
| User | Dials first digit of pager account number |
| LSU | Removes Dial Tone |
| User | Dials next five digits of pager account number |
| LSU | Gives BEEP |
| LSU | Gives Dial Tone |
| User | Dials display data |
| User | Makes mistake - press '*' |
| LSU | Gives BEEP |
| LSU | Gives Dial Tone |
| User | Dials display data |
| User | Is through dialing display data - press '#' |
| LSU | Gives BEEP - BEEP - BEEP |
| LSU | Disconnects |
| LSU | Formats Page Record |
| | Installs Pager Number |
| | Installs Data Code |
| | Looks up Destination Code, installs |
| | Calculates data blocks required |
| | Obtains source ID number |
| | Installs data |
| LSU | Determines that page destination is one of the local TSU's |
| LSU | Requests and obtains packet ID number |
| LSU | Stores PAGREC in CURRENT PAGE BUFFER |
| LSU | Sends Page Record Holding message to TSU |
| TSU | WAIT STAGE periodically sends 'tick' to Status Service Unit |
| TSU | Receives Page Record Ready message |
| TSU | Loads Page Record into buffer |
| TSU | Formats Page Record into POCSAG format and installs in POCSAG buffer |
| TSU | Checks Holding Time |
| | If not started, starts Holding Time |
| TSU | Awaits Holding Time Time-out or next Page Record Ready Message |
| TSU | Sends Transmitter Time Request to RCC transmitter controller |
| RCC | Transmitter controller sends 'WAIT' or 'GO' |
| | If TSU receives WAIT |
| | TSU starts 'Max Wait Timer' |
| | If Max Wait Timer times out |
| | TSU sends error message to RSU |
| | RSU receives error message |
| | RSU connects to Monitor Facility |
| | RSU sends 'RCC Transmitter Controller Out-Of-Service Message' |
| TSU | Receives 'GO' |
| TSU | Sends 'Transmitter On Command Sequence' |
| TSU | Starts 'Max Wait Timer' |
| | If TSU receives 'Transmitter Fault' from RCC Transmitter Controller |
| | Or if Max Wait Timer times out |
| | TSU sends 'Transmitter Fault' message to RSU queue |
| RCC | Transmitter Controller sends 'Transmitter On' acknowledgement |
| TSU | Sends POCSAG buffer to RCC Transmitter |
| TSU | Pauses |
| TSU | Sends 'Transmitter Release' message to RCC Transmitter Controller |
| TSU | Starts Max Wait Timer |
| TSU | Starts Repeat Control Burst timer |
| | If Repeat Control Burst Timer times out |
| | TSU sends 'Transmitter Release' message again |
| | If Max Wait Timer times out |
| | TSU sends 'Transmitter Controller Fault 2' message to RSU Queue |
| TSU | Sends Page Complete message to ASU |
| TSU | Returns to WAIT stage |
| | -END OF SEQUENCE- |

TABLE 3

NUMERIC CALL-AUTOMATIC DTMF-LINE-NATIONWIDE RCC SITE PROCESSOR

| | |
|---|---|
| User | Dials local line and connects to one of the 'Line n' inputs |
| LSU | Detects ringing on line |
| | Siezes line |
| | Gives dial tone |
| User | Dials first digit of pager account number |
| LSU | Removes Dial Tone |
| User | Dials next five digits of pager account number |
| LSU | Gives BEEP |
| LSU | Gives Dial Tone |
| User | Dials display data |
| User | Makes mistake - press '*' |
| LSU | Gives BEEP |
| LSU | Gives Dial Tone |
| User | Dials display data |
| User | Is through dialing display data - press '#' |
| LSU | Gives BEEP - BEEP - BEEP |
| LSU | Disconnects |
| LSU | Formats Page Record |
| | Installs Pager Number |
| | Installs Data Code |
| | Looks up Destination Code, installs |
| | Calculates data blocks required |
| | Obtains source ID number |
| | Installs data |
| LSU | Determines that page requires National routing |
| LSU | Requests and obtains packet ID number |
| LSU | Stores PAGREC in CURRENT PAGE BUFFER |
| LSU | Sends Page Record Holding message to TSU |
| RSU | Receives Page Record Holding message |
| | If no Page Records holding |
| | RSU set page holding time to await additional blocks |
| | If Page Record Holding Time not time-out, wait |
| | RSU connects modem to Central RSU Traffic Route Processor |
| | If unable to make connection |
| | Repeat connection attempt |
| | If five attempts |
| | Connect to Monitor Facility and report error |
| RSU | Sends all current Holding Records |
| RSU | Awaits handshake for Repeat Request(s) |
| RSU | Resets, awaits next Page Record |

TRAFFIC ROUTE PROCESSOR

| | |
|---|---|
| RSU | (From RCC Site) receives Page Records from RCC site |
| RSU | Checks Source Record ID Number |
| | If not sequential |
| | RSU sends 'Repeat nnnn Request' to RCC Site Processor |
| | RSU receives repeated Records |
| RSU | Checks Destination Code Address |
| | If Destination inaccurate, generates 'New Destination Code' |
| | Record for transmission to RCC Site Processor |
| RSU | Assigns Destination Packet ID number to each Page Record |
| RSU | Sends Page Record Ready message to Uplink RSU |

UPLINK PROCESSOR

| | |
|---|---|
| RSU | (To Uplink) receives Page Records Ready message |
| RSU | Loads Page Records into Page Record Block Queue |
| RSU | Sends Page Records Ready message to next USU |
| USU | Receives Page Records Ready message from RSU |
| USU | Loads Page Records |
| USU | Awaits Transmission Time loop |
| USU | Output Page Records in Block format |

SATELLITE SYSTEM SENDS TO DOWNLINK DESTINATION RCC SITE PROCESSOR

| | |
|---|---|
| DSU | Detects record block with correct Destination ID |
| DSU | Signals next DSU to prepare for input |
| DSU | Finishes input of Page Record |
| DSU | Signals 'GO' to next DSU |
| DSU | Checks and corrects received Page Record |
| DSU | Requests and obtains a Packet ID from the local SSU |
| DSU | Loads Page Record to TSU queue |
| DSU | Sends Page Record Ready to TSU |
| DSU | Awaits next 'Prepare to Receive Data' from other DSU(s) |
| TSU | WAIT STATE periodically sends 'tick' to Status Service Unit |
| TSU | Receives Page Record Ready message |
| TSU | Loads Page Record into buffer |

TABLE 3-continued

NUMERIC CALL-AUTOMATIC DTMF-LINE-NATIONWIDE RCC SITE PROCESSOR

| | |
|---|---|
| TSU | Formats Page Record into POCSAG format and installs in POCSAG buffer |
| TSU | Checks Holding Time |
| | If not started, starts Holding Time |
| TSU | Awaits Holding Time Time-out or next Page Record Ready message |
| TSU | Sends Transmitter Time Request to RCC transmitter controller |
| RCC | Transmitter controller sends 'WAIT' or 'GO' |
| | If TSU receives WAIT |
| | TSU starts 'Max Wait Timer' |
| | If Max Wait Timer times out |
| | TSU sends error message to RSU |
| | RSU receives error message |
| | RSU connects to Monitor Facility |
| | RSU sends 'RCC Transmitter Controller Out-Of-Service Message' |
| TSU | Receives 'GO' |
| TSU | Sends 'Transmitter On Command Sequence' |
| TSU | Starts 'Max Wait Timer' |
| | If TSU receives 'Transmitter Fault' from RCC Transmitter Control |
| | Or if Max Wait Timer times out |
| | TSU sends 'Transmitter Fault' message to RSU queue |
| RCC | Transmitter Controller sends 'Transmitter On' acknowledgement |
| TSU | Sends POCSAG buffer to RCC Transmitter |
| TSU | Pauses |
| TSU | Sends 'Transmitter Release' message to RCC Transmitter Controller |
| TSU | Starts Max Wait Timer |
| TSU | Starts Repeat Control Burst timer |
| | If Repeat Control Burst Timer times out |
| | TSU sends 'Transmitter Release' message again |
| | If Max Wait Timer times out |
| | TSU sends 'Transmitter Controller Fault 2' message to RSU Queue |
| TSU | Sends Page Complete message to ASU |
| TSU | Returns to WAIT stage |
| | -END OF SEQUENCE- |

TABLE 4

ALPHANUMERIC INPUT-OPERATOR-LOCAL

| | |
|---|---|
| OSU | Initialization |
| | If modem connection required |
| | If DIAL NUMBER contains data |
| | OSU prompts modem for connection |
| | If five trys with no modem response |
| | OSU sends 'Modem Fault Detect' to SSU |
| | Modem Responds |
| | Sends Dial Data to Modem |
| | Modem dials number |
| | Modem sends 'Waiting for Carrier' message to OSU |
| | If modem does not detect carrier |
| | Modem sends 'No Data Carrier' message to OSU |
| | OSU retrys |
| | Every fifth try OSU sends 'Line Fault Detect' to SSU |
| | Modem sends 'Data Carrier Detect' |
| OSU | Sends 'Console Type Request' to remote terminal |
| | If console does not respond to type select |
| | OSU selects 'dumb console' default parameters |
| | If console responds with type |
| | OSU selects appropriate control code commands based on received console type |
| OSU | Displays Operator Menu |
| OSU | Enters WAIT STATE |
| OSU | WAIT STATE periodically sends 'tick' to SSU |
| | - End OSU initialization |
| | Operator selects desired function (PLACE A PAGE) |
| OSU | Prompts for Pager Number |
| | If Operator press CR without data |
| | OSU re-displays menu |
| | Operator enter pager number, using backspace and delete for edits |
| | Operator presses CR |

TABLE 4-continued
ALPHANUMERIC INPUT-OPERATOR-LOCAL

| | |
|---|---|
| OSU | Looks up page number, sets control block |
| | If pager number is not valid |
| | OSU sends 'Invalid Pager Number Error' message to Operator |
| | OSU re-prompts for Pager Number |
| OSU | Prompts for Display Data |
| | If Operator presses CR without data |
| | Tone Only Page, proceed to OSU formats Page Record |
| | Operator types in Display Data, using backspace and delete for edits |
| | Operator presses CR |
| OSU | Formats Page Record |
| | Installs Pager Number |
| | Installs Data Code |
| | Looks up Destination Code, Installs |
| | Calculates data blocks required |
| | Obtains source ID number |
| | Installs data |
| OSU | Determines that the page is to be placed locally |
| OSU | Requests and obtains Packet ID number |
| OSU | Stores PAGREC in CURRENT PAGE BUFFER |
| OSU | Sends Page Record Holding message to TSU |
| TSU | WAIT STATE periodically sends 'tick' to Status Service Unit |
| TSU | Receives Page Record Ready message |
| TSU | Loads Page Record into buffer |
| TSU | Formats Page Record into POCSAG format and installs in POCSAG buffer |
| TSU | Checks Holding Time |
| | If not started, starts Holding Time |
| TSU | Awaits Holding Time time-out or next Page Record Ready Message |
| TSU | Sends Transmitter Time Request to RCC Transmitter Controller |
| RCC | Transmitter Controller sends 'WAIT' or 'GO' |
| | If TSU receives WAIT |
| | TSU starts 'Max Wait Timer' |
| | If Max Wait Timer times out |
| | TSU sends error message to RSU |
| | RSU receives error message |
| | RSU connects to Monitor Facility |
| | RSU sends 'RCC Transmitter Controller Out-Of-Service Message' |
| TSU | Receives 'GO' |
| TSU | Sends 'Transmitter On Command Sequence' |
| TSU | Starts 'Max Wait Timer' |
| | If TSU receives 'Transmitter Fault' from RCC Transmitter Controller |
| | Or if Max Wait Timer times out |
| | TSU sends 'Transmitter Fault' message to RSU queue |
| RCC | Transmitter Controller sends 'Transmitter On' acknowledged |
| TSU | Sends POCSAG buffer to RCC Transmitter |
| TSU | Pauses |
| TSU | Sends 'Transmitter Release' message to RCC Transmitter Controller |
| TSU | Starts Max Wait Timer |
| TSU | Starts Repeat Control Burst timer |
| | If Repeat Control Burst Timer times out |
| | TSU sends 'Transmitter Release' message again |
| | If Max Wait Timer Times out |
| | TSU sends 'Transmitter Controller Fault 2' message to RSU Queue |
| TSU | Sends Page Complete message to ASU |
| TSU | Returns to WAIT stage |
| | -END OF SEQUENCE- |

TABLE 5
ALPHANUMERIC INPUT-OPERATOR-NATIONWIDE

| | |
|---|---|
| OSU | Initialization |
| | If modem connection required |
| | If DIAL NUMBER contains data |
| | OSU prompts modem for connection |
| | If five trys with no modem response |
| | OSU sends 'Modem Fault Detect' to SSU |
| | Modem response |
| | OSU sends Dial Data to Modem |
| | Modem dials number |
| | Modem sends 'Waiting for Carrier' message to OSU |
| | If modem does not detect carrier |
| | Modem sends 'No Data Carrier' message to OSU |
| | OSU retrys |
| | Every fifty try OSU sends 'Line Fault Detect' to SSU |
| | Modem sends 'Data Carrier Detect' |
| OSU | Sends 'Console Type Request' to remote terminal |
| | If console does not respond to type select |
| | OSU selects 'dumb console' default parameters |
| | If console responds with type |
| | OSU selects appropriate control code commands based on received console type |
| OSU | Displays Operator Menu |
| OSU | Enters WAIT STATE |
| OSU | WAIT STATE periodically sends 'tick' to SSU |
| | - End OSU initialization |
| | Operator selects desired function (PLACE A PAGE) |
| OSU | Prompts for Pager Number |
| | If Operator press CR without data |
| | OSU re-displays menu |
| | Operator enter pager number, using backspace and delete for edits |
| | Operator presses CR |
| OSU | Looks up page number, gets control block |
| | If pager number is not valid |
| | OSU sends 'Invalid Pager Number Error' message to Operator |
| | OSU re-prompts for Pager Number |
| OSU | Prompts for Display Data |
| | If Operator presses CR without data |
| | Tone Only Page, proceed to OSU formats Page Record |
| | Operator types in Display Data, using backspace and delete for edits |
| | Operator presses CR |
| OSU | Formats Page Record |
| | Installs Pager Number |
| | Installs Data Code |
| | Looks up Destination Code, Installs |
| | Calculates data blocks required |
| | Obtains source ID number |
| | Installs data |
| OSU | Determines that the call is to be routed National system |
| OSU | Requests and obtains Packet ID number |
| OSU | Stores PAGREC in CURRENT PAGE BUFFER |
| OSU | Sends Page Record Holding message to RSU |
| RSU | Receives Page Record Holding message |
| | If no Page Records Holding |
| | RSU set page holding time to await additional blocks |
| | If Page Record Holding Time Not timed out, wait |
| | RSU connects modem to Central RSU Traffic Route Processor |
| | If unable to make connection |
| | Repeat connection attempt |
| | If five attempts |
| | Connect to Monitor Facility and report Error |
| RSU | Sends all current Holding Records |
| RSU | Awaits handshake for Repeat Request(s) |
| RSU | Resets, awaits next Page Record |

TRAFFIC ROUTE PROCESSOR

| | |
|---|---|
| RSU | (From RCC Site) receives Page Records from RCC SITE |
| RSU | Checks Source Record ID Number |
| | If not sequential |
| | RSU sends 'Repeat nnnn Request' to RCC Site Processor |
| | RSU receives repeated Records |
| RSU | Checks Destination Code Address |
| | If Destination inaccurate, generates 'New Destination Code' Record for transmission to RCC Site Processor |
| RSU | Assigns Destination Packet ID number to each Page Record |
| RSU | Sends Page Record Ready message to Uplink RSU |

UPLINK PROCESSOR

| | |
|---|---|
| RSU | (To Uplink) receives Page Records Ready message |
| RSU | Loads Page Records into Page Record Block Queue |
| RSU | Sends Page Records Ready message to next USU |
| USU | Receives Page Records Ready message from RSU |
| USU | Loads Page Records into ram buffer |
| USU | Awaits Transmission Time loop |
| USU | Output Page Records in Block format |
| | SATELLITE SYSTEM SENDS TO DOWNLINK |

TABLE 5-continued
ALPHANUMERIC INPUT-OPERATOR-NATIONWIDE
DESTINATION RCC SITE PROCESSOR DSU Detects record block with correct Destination ID
DSU Signals next DSU to prepare for input
DSU Finishes input of Page Record
DSU Signals 'GO' to next DSU
DSU Checks and corrects received Page Record
DSU Requests and obtains a Packet ID from the local SSU
DSU Loads Page Record to TSU queue
DSU Sends Page Record Ready to TSU
DSU Awaits next 'Prepare to Receive Data' from other DSU(s)
TSU WAIT STATE periodically sends 'tick' to Status Service Unit
TSU Receive Page Record Ready message
TSU Loads Page Record into buffer
TSU Formats Page Record into POCSAG format and installs in POCSAG buffer
TSU Checks Holding Time
    If not started, starts Holding Time
TSU Awaits Holding Time time out or next Page Record Ready Message
TSU Sends Transmitter Time Request to RCC Transmitter Controller
RCC Transmitter Controller sends 'WAIT' or 'GO'
    If TSU receives WAIT
    TSU starts 'Max Wait Timer'
    If Max Wait Timer times out
    TSU sends error message to RSU
    RSU receives error message
    RSU connects to Monitor Facility
    RSU sends 'RCC Transmitter Controller Out-Of-Service Message'
TSU Receives 'GO'
TSU Sends 'Transmitter On Command Sequence'
TSU Starts 'Max Wait Timer'
    If TSU receives 'Transmitter Fault' from RCC Transmitter Controller
    Or if Max Wait Timer times out
    TSU sends 'Transmitter Fault' message to RSU queue
RCC Transmitter Controller sends 'Transmitter On' acknowledgement
TSU Sends POCSAG buffer to RCC Transmitter
TSU Pauses
TSU Sends 'Transmitter Release' message to RCC Transmitter Controller
TSU Starts Max Wait Timer
TSU Starts Repeat Control Burst timer
    If Repeat Control Burst Timer times out
    TSU sends 'Transmitter Release' message again
    If Max Wait Timer times out
    TSU sends 'Transmitter Controller Fault 2' message to RSU Queue
TSU Send Page Complete message to ASU
TSU Returns to WAIT stage
-END OF SEQUENCE-

TABLE 6
ALPHANUMERIC INPUT-MANUAL-CUSTOMER SERVICE UNIT-LOCAL (Customer Equipped with Console and Modem - No Processor)
CSU WAIT STATE periodically sends 'tick' to SSU
    Calling party dials line number
    Modem Detects ring signal
    Modem answers
    Calling party presses or sends CR
CSU Requests logon ID (which contains type specification)
    If calling party sends invalid logon ID
    CSU sends 'Invalid Logon ID'
    CSU disconnects modem
    CSU returns to WAIT STATE
    Calling party responds with valid logon ID
    CSU selects appropriate console command codes based on type specification in Logon ID
CSU Sends appropriate Customer Service Menu
CSU Resets 'Dead Console' timer
    If 'Dead Console' Timer times out
    CSU sends 'No Activity Time out Error'
    CSU disconnects modem
    Calling party selects desired function (PLACE A PAGE)

TABLE 6-continued
ALPHANUMERIC INPUT-MANUAL-CUSTOMER SERVICE UNIT-LOCAL

CSU Prompts for Pager Number
    If Customer press CR without data
    CSU re-displays menu
    Customer enter pager number using backspace and delete for edits
    Customer presses CR
CSU Looks up page number, gets control block
    If pager number is not valid
    CSU sends 'Invalid Pager Number Error' message to Customer
    CSU re-prompts for Pager Number
CSU Prompts for Display Data
    If Customer presses CR without data
    Tone Only Page, proceed to CSU formats Page Record
    Customer types in Display Data, using backspace and delete for edits
    Customer presses CR
CSU Formats Page Record
    Installs Pager Number
    Installs Data Code
    Looks up Destination Code, Installs
    Calculates data blocks required
    Obtains source ID number
    Installs data
CSU Determines that page should be processed locally
CSU Requests and obtains Packet ID number
CSU Stores PAGREC in CURRENT PAGE BUFFER
CSU Sends Page Record holding message to TSU
CSU Disconnects modem
TSU WAIT STATE periodically sends 'tick' to Status Service Unit
TSU Receives Page Record Ready message
TSU Loads Page Record into buffer
TSU Formats Page Record into POCSAG format and installs in POCSAG buffer
TSU checks Holding Time
    If not started, starts Holding Time
TSU Awaits Holding Time time out or Next Page Record Ready message
TSU Sends Transmitter Time Request to RCC Transmitter Controller
RCC Transmitter Controller sends 'WAIT' or 'GO'
    If TSU receives WAIT
    TSU starts 'Max Wait Timer'
    If Max Wait Timer times out
    TSU sends error message to RSU
    RSU receives error message
    RSU connects to Monitor Facility
    RSU sends 'RCC Transmitter Controller Out-Of-Service Message'
TSU Receives 'GO'
TSU Sends 'Transmitter On Command Sequence'
TSU Starts 'Max Wait Timer'
    If TSU receives 'Transmitter Fault' from RCC Transmitter Controller
    Or if Max Wait Timer times out
    TSU sends 'Transmitter Fault' message to RSU Queue
RCC Transmitter Controller sends 'Transmitter On' acknowledgement
TSU Sends POCSAG buffer to RCC Transmitter
TSU Pauses
TSU Sends 'Transmitter Release' message to RCC Transmitter Controller
TSU Starts Max Wait Timer
TSU Starts Repeat Control Burst timer
    If Repeat Control Burst Timer times out
    TSU sends 'Transmitter Release' message again
    If Max Wait Timer times out
    TSU sends 'Transmitter Control Fault 2' message to RSU Queue
TSU Sends Page Complete message to ASU
TSU Returns to WAIT STATE
-END OF SEQUENCE-

TABLE 7

ALPHANUMERIC INPUT - MANUAL - CUSTOMER SERVICE UNIT - NATIONWIDE

| | |
|---|---|
| CSU | WAIT STATE periodically sends 'tick' to SSU |
| | Calling party dials line number |
| | Modem Detects ring signal |
| | Modem answers |
| | Calling party presses or sends CR |
| CSU | Requests logon ID (which contains type specification) |
| | If calling party sends invalid logon ID |
| | CSU sends 'Invalid Logon ID' |
| | CSU disconnects modem |
| | CSU returns to WAIT STATE |
| | Calling party responds with valid logon ID |
| | CSU selects appropriate console command codes based on type specification in Logon ID |
| CSU | Sends appropriate Customer Service Menu |
| CSU | Resets 'Dead Console' timer |
| | If 'Dead Console' Timer times out |
| | CSU sends 'No Activity Time out Error' |
| | CSU disconnects modem |
| | Calling party selects desired function (PLACE A PAGE) |
| CSU | Prompts for Pager Number |
| | If Customer press CR without data |
| | CSU re-displays menu |
| | Customer enter pager number using backspace and delete for edits |
| | Customer presses CR |
| CSU | Looks up page number, gets control block |
| | If pager number is not valid |
| | CSU sends 'Invalid Pager Number Error' message to Customer |
| | CSU re-prompts for Pager Number |
| CSU | Prompts for Display Data |
| | If Customer presses CR without data |
| | Tone Only Page, proceed to CSU formats Page Record |
| | Customer types in Display Data, using backspace and delete for edits |
| | Customer presses CR |
| CSU | Formats Page Record |
| | Intalls Pager Number |
| | Installs Date Code |
| | Looks up Destination Code, Installs |
| | Calculates data blocks required |
| | Obtains source ID number |
| | Installs data |
| CSU | Determines that page should be placed on the National System |
| CSU | Requests and obtains Packet ID Number |
| CSU | Stores PAGREC in CURRENT PAGE BUFFER |
| CSU | Sends Page Record holding message to TSU |
| CSU | Disconnects modem |
| RSU | Receives Page Record Holding message |
| | If no Page Records Holding |
| | RSU set page holding time to await additional blocks |
| | If Page Record Holding Time not timed out, wait |
| RSU | Connects modem to Central RSU Traffic Rout Processor |
| | If unable to make connection |
| | Repeat connection attempt |
| | If five attempts |
| | Connect to Monitor Facility and report Error |
| RSU | Sends all current Holding Records |
| RSU | Awaits handshake for Repeat Request(s) |
| RSU | Resets, await next Page Record |
| | TRAFFIC ROUTE PROCESSOR |
| RSU | (From RCC Site) receives Page Records from RCC SITE |
| RSU | Checks Source Record ID Number |
| | If not sequential |
| | RSU sends 'Repeat nnnn Request' to RCC Site Processor |
| | RSU receives repeated records |
| RSU | Checks Destination Code Address |
| | If Destination inaccurate, generates 'New Destination Code' Record for transmission to RCC Site Processor |
| RSU | Assigns Destination Packet ID Number to each Page Record |
| RSU | Sends Page Record Ready message to Uplink RSU |
| | UPLINK PROCESSOR |
| RSU | (To Uplink) receives Page Records Ready message |
| RSU | Loads Page Records into Page Record Block Queue |
| RSU | Sends Page Records Ready message to next USU |
| USU | Receives Page Records Ready message from RSU |
| USU | Loads Page Records into ram buffer |

TABLE 7-continued

ALPHANUMERIC INPUT - MANUAL - CUSTOMER SERVICE UNIT - NATIONWIDE

| | |
|---|---|
| USU | Awaits Transmission Time loop |
| USU | Output Page Records in Block format |
| | SATELLITE SYSTEM SENDS TO DOWNLINK DESTINATION RCC SITE PROCESSOR |
| DSU | Detects record block with correct Destination ID |
| DSU | Signals next DSU to prepare for input |
| DSU | Finishes input of Page Record |
| DSU | Signals 'GO' to next DSU |
| DSU | Checks and corrects received Page Record |
| DSU | Requests and obtains a Packet ID from the local SSU |
| DSU | Loads Page Record to TSU queue |
| DSU | Sends Page Record Ready to TSU |
| DSU | Awaits next 'Prepare to Receive Data ' from other DSU(s) |
| TSU | WAIT STATE periodically sends 'tick' to Status Service Unit |
| TSU | Receives Page Record Ready message |
| TSU | Loads Page Record into buffer |
| TSU | Formats Page Record into POCSAG format and installs in POCSAG buffer |
| TSU | Checks Holding Time |
| | If not started, starts Holding Time |
| TSU | Awaits Holding Time time out or Next Page Record Ready message |
| TSU | Sends Transmitter Time Request to RCC Transmitter Controller |
| RCC | Transmitter Controller sends 'WAIT' or 'GO' |
| | If TSU receives WAIT |
| | TSU starts 'Max Wait Timer' |
| | If Max Wait Timer times out |
| | TSU sends error message to RSU |
| | RSU receives error message |
| | RSU connects to Monitor Facility |
| | RSU sends 'RCC Transmitter Controller Out-of-Service Message' |
| TSU | Receives 'GO' |
| TSU | Sends 'Transmitter On Command Sequence' |
| TSU | Starts 'Max Wait Timer' |
| | If TSU receives 'Transmitter Fault' from RCC Transmitter Controller |
| | Or if Max Wait Timer times out |
| | TSU sends 'Transmitter Fault' message to RSU Queue |
| RCC | Transmitter Controller sends 'Transmitter On' acknowledgement |
| TSU | Sends POCSAG buffer to RCC Transmitter |
| TSU | Pauses |
| TSU | Sends 'Transmitter Release' message to RCC Transmitter Controller |
| TSU | Starts Max Wait Timer |
| TSU | Starts Repeat Control Burst timer |
| | If Repeat Control Burst Timer times out |
| | TSU sends 'Transmitter Release' message again |
| | If Max Wait Timer times out |
| | TSU sends 'Transmitter Control Fault 2' message to RSU Queue |
| TSU | Sends Page Complete message to ASU |
| TSU | Returns to WAIT STATE |
| | -END OF SEQUENCE- |

TABLE 8

ALPHANUMERIC INPUT - ENCODER - CUSTOMER SERVICE UNIT - LOCAL

| | |
|---|---|
| CSU | WAIT STATE periodically sends 'tick' to SSU |
| | Calling device dials line number |
| | Modem detects ring signal |
| | Modem answers |
| | Calling device presses or sends CR |
| CSU | Requests logon ID (which contains type specification) |
| | If calling device sends invalid logon ID |
| | CSU sends 'Invalid Logon ID' |
| | CSU disconnects modem |
| | CSU returns to WAIT STATE |
| | Calling device responds with valid logon ID |
| | CSU selects no echo, no prompt |
| | Calling device sends Pager Number, CR |
| | CSU looks up Pager Number |
| | If Pager Number not valid |
| | CSU sends 'Error Response Message' |

TABLE 8-continued

ALPHANUMERIC INPUT - ENCODER - CUSTOMER SERVICE UNIT - LOCAL

CSU disconnects
    CSU returns to WAIT STATE
    Calling device inputs Display Data
    Calling device inputs CR
CSU Formats Page Record
    Installs Pager Number
    Installs Date Code
    Looks up Destination Code, Installs
    Calculates data blocks required
    Obtains source ID number
    Installs data
CSU Determines that page should be processed locally
CSU Requests and obtains Packet ID Number
CSU Stores PAGREC in CURRENT PAGE BUFFER
CSU Sends Page Record holding message to TSU
CSU Disconnects modem
TSU WAIT STATE periodically sends 'tick' to Status Service Unit
TSU Receives Page Record Ready message
TSU Loads Page Record into buffer
TSU Formats page Record into POCSAG format and installs in POCSAG buffer
TSU checks Holding Time
    If not started, starts Holding Time
TSU Awaits Holding Time time out or Next Page Record Ready message
TSU Sends Transmitter Time Request to RCC Transmitter Controller
RCC Transmitter Controller sends 'WAIT' or 'GO'
    If TSU receives WAIT
    TSU starts 'Max Wait Timer'
    If Max Wait Timer times out
    TSU sends error message to RSU
    RSU receives error message
    RSU connects to Monitor Facility
    RSU sends 'RCC Transmitter Controller Out-of-Service Message'
TSU Receives 'GO'
TSU Sends 'Transmitter On Command Sequence'
TSU Starts 'Max Wait Timer'
    If TSU receives 'Transmitter Fault' from RCC Transmitter Controller
    Or if Max Wait Timer times out
    TSU sends 'Transmitter Fault' message to RSU Queue
RCC Transmitter Controller sends 'Transmitter On' acknowledgement
TSU Sends POCSAG buffer to RCC Transmitter
TSU Pauses
TSU Sends 'Transmitter Release' message to RCC Transmitter Controller
TSU Starts Max Wait Timer
TSU Starts Repeat Control Burst timer
    If Repeat Control Burst Timer times out
    TSU sends 'Transmitter Release' message again
    If Max Wait Timer times out
    TSU sends 'Transmitter Control Fault 2' message to RSU Queue
TSU Sends Page Complete message to ASU
TSU Returns to WAIT STATE
    -END OF SEQUENCE-

TABLE 9

ALPHANUMERIC INPUT - ENCODER - CUSTOMER SERVICE UNIT - NATIONWIDE

CSU WAIT STATE periodically sends 'tick' to SSU
    Calling device dials line number
    Modem Detects ring signal
    Modem answers
    Calling device presses or sends CR
CSU Requests logon ID (which contains type specification)
    If calling device sends invalid logon ID
    CSU sends 'Invalid Logon ID'
    CSU disconnects modem
    CSU returns to WAIT STATE
    If calling device responds valid ID and Automatic Encoder
    CSU selects no echo, no prompt
    Calling device sends Pager Number, CR

TABLE 9-continued

ALPHANUMERIC INPUT - ENCODER - CUSTOMER SERVICE UNIT - NATIONWIDE

CSU looks up Pager Number
    If Pager Number not valid
    CSU sends 'Error Response Message'
    CSU disconnects
    CSU returns to WAIT STATE
    Calling device inputs Display Data
    Calling device inputs CR
CSU Formats Page Record
    Installs Pager Number
    Installs Date Code
    Looks up Destination Code, Installs
    Calculates data blocks required
    Obtains source ID number
    Installs data
CSU Determines that page should be placed on the National System
CSU Requests and obtains Packet ID Number
CSU Stores PAGREC in CURRENT PAGE BUFFER
CSU Sends Page Record holding message to TSU
CSU Disconnects modem
RSU Receives page Record Holding message
    If no Page Records Holding
    RSU set page holding time to await additional blocks
    If Page Record Holding Time not timed out, wait
RSU Connects modem to Central RSU Traffic Route Processor
    If unable to make connection
    Repeat connection attempt
    If five attempts
    Connect to Monitor Facility and report Error
RSU Sends all current Holding Records
RSU Awaits handshake for Repeat Request(s)
RSU Resets, await next Page Record
    TRAFFIC ROUTE PROCESSOR
RSU (From RCC Site) receives Page Records from RCC site
RSU Checks Source Record ID Number
    If not sequential
    RSU sends 'Repeat nnnn Request' to RCC Site Processor
    RSU receives repeated records
RSU Checks Destination Code Address
    If Destination inaccurate, generates 'New Destination Code' Record for transmission to RCC Site Processor
RSU Assigns Destination Packet ID Number to each Page Record
RSU Sends page Record Ready message to Uplink RSU
    UPLINK PROCESSOR
RSU (To Uplink) receives Page Records Ready message
RSU Loads Page Records into Page Record Block Queue
RSU Sends page Records Ready message to next USU
USU Receives Page Records Ready message from RSU
USU Loads Page Records into ram buffer
USU Awaits Transmission Time loop
USU Output Page Records in Block format
    SATELLITE SYSTEM SENDS TO DOWNLINK DESTINATION RCC SITE PROCESSOR
DSU Detects record block with correct Destination ID
DSU Signals next DSU to prepare for input
DSU Finishes input of Page Record
DSU Signals 'GO' to next DSU
DSU Checks and corrects received Page Record
DSU Requests and obtains a Packet ID from the local SSU
DSU Loads Page Record to TSU queue
DSU Sends Page Record Ready to TSU
DSU Awaits next 'Prepare to Receive Data' from other DSU(s)
TSU WAIT STATE periodically sends 'tick' to Status Service Unit
TSU Receives Page Record Ready message
TSU Loads Page Record into buffer
TSU Formats Page Record into POCSAG format and installs in POCSAG buffer
TSU Checks Holding Time
    If not started, starts Holding Time
TSU Awaits Holding Time time out or Next Page Record Ready message
TSU Sends Transmitter Time Request to RCC Transmitter Controller
RCC Transmitter Controller sends 'WAIT' or 'GO'
    If TSU receives WAIT
    TSU starts 'Max Wait Timer'
    If Max Wait Timer times out

TABLE 9-continued
ALPHANUMERIC INPUT - ENCODER - CUSTOMER SERVICE UNIT - NATIONWIDE

|     |     |
| --- | --- |
|     | TSU sends error message to RSU |
|     | RSU receives error message |
|     | RSU connects to Monitor Facility |
|     | RSU sends 'RCC Transmitter Controller Out-of-Service Message' |
| TSU | Receives 'GO' |
| TSU | Sends 'Transmitter On Command Sequence' |
| TSU | Starts 'Max Wait Timer' |
|     | If TSU receives 'Transmitter Fault' from RCC Transmitter Controller |
|     | Or if Max Wait Timer times out |
|     | TSU sends 'Transmitter Fault' message to RSU Queue |
| RCC | Transmitter Controller sends 'Transmitter On' acknowledgement |
| TSU | Sends POCSAG buffer to RCC Transmitter |
| TSU | Pauses |
| TSU | Sends 'Transmitter Release' message to RCC Transmitter Controller |
| TSU | Starts Max Wait Timer |
| TSU | Starts Repeat Control Burst timer |
|     | If Repeat Control Burst Timer times out |
|     | TSU sends 'Transmitter Release' message again |
|     | If Max Wait Timer times out |
|     | TSU sends 'Transmitter Control Fault 2' message to RSU Queue |
| TSU | Sends Page Complete message to ASU |
| TSU | Returns to WAIT STATE |
|     | -END OF SEQUENCE- |

TABLE 10
ADDITIONAL OPERATOR FUNCTIONS

|     |     |
| --- | --- |
| OSU | In Wait State, periodically sends 'tick' to SSU |
|     | Operator presses 'D' for Display a pager Control Block |
|     | OSU prompts for Pager Account Number |
|     | Operator made mistake, pressed 'D' key by mistake |
|     | Operator presses RETURN without pager number |
|     | OSU re-displays Menu |
|     | OSU returns to Wait State |
|     | Operator enters Pager Account Number |
|     | OSU converts account number to binary record number |
|     | OCU obtains Pager Control Block from hard disk data file |
|     | OSU displays current Pager Control Block contents |
| OSU | Prompts for 'Change of Menu' command |
|     | Operator selects Menu |
|     | OSU re-displays Menu |
|     | OSU returns to Wait State |
|     | Operator selects Change |
| OSU | Prompts for new Pager Cap-Code |
|     | Operator does not want to change Pager Cap Code |
|     | Operator presses RETURN with no data |
|     | OSU proceeds to 'Owner System' selection |
|     | Operator enters new Pager Cap Code |
|     | OSU stores Pager Cap Code in Data File (Owner Selection) |
| OSU | Checks Owner System |
|     | IF Owner System is '000' (new pager on system) |
|     | OSU installs local system ID as Owner System |
|     | OSU installs 'New Pager' page type in PAGREC |
|     | If Owner System is not '000' (update existing pager) |
|     | OSU installs 'Update' page type in PAGREC |
| OSU | Prompts for Current Location telephone number of 'L' if local |
|     | Operator presses RETURN with no data |
|     | OSU proceeds to 'Current Status' section |
|     | Operator presses 'L' key |
|     | OSU installs current system ID as Current Location |
|     | Operator enters an Area Code and Exchange of Location City |
|     | OSU calculates record position in Service Area File |
|     | OSU obtains destination system ID |
|     | OSU installs destination system ID in PAGREC (Current Status) |
| OSC | Prompts for current status of pager |
|     | Operator presses RETURN with no data |
|     | OSU proceeds to 'PAGREC' section |
|     | Operator enters new Status Code |
|     | OSU installs new status code in PAGREC (PAGREC) |

TABLE 10-continued
ADDITIONAL OPERATOR FUNCTIONS

|     |     |
| --- | --- |
| OSU | Checks PAGREC to see if any changes have been made |
|     | If any changes made |
|     | OSU formats Page record |
|     | Installs Pager Number |
|     | Installs Data Code |
|     | Obtains Source ID Number |
|     | Installs data |
| OSU | Requests and obtains Packet ID Number |
| OSU | Stores PAGREC in CURRENT PAGE BUFFER |
| OSC | Sends Page Record Holding message to RSU |
| RSU | Receives Page Record Holding Message |
|     | If no Page Records holding |
|     | RSU set page holding time to await additional blocks |
|     | If Page Record holding Time not timed out, wait |
| RSU | Connects modem to Central RSU Traffic Route Processor |
|     | If unable to make connection |
|     | Repeat connection attempt |
|     | If five attempts |
|     | Connect to Monitor Facility and report error |
| RSU | Sends all current Holding Records |
| RSU | Awaits handshake for Repeat Request(s) |
| RSU | Resets, Awaits next Page Record |

TRAFFIC ROUTE PROCESSOR

|     |     |
| --- | --- |
| RSU | (From RCC Site) receives Page Records from RCC SITE |
| RSU | Checks Source Record ID Number |
|     | If not sequential |
|     | RSU sends 'Repeat nnnn Request' to RCC Site Processor |
|     | RSU receives repeated records |
| RSU | Checks Destination Code Address |
|     | If Destination inaccurate, generates 'New Destination Code' Record for transmission to RCC Site Processor |
| RSU | Assigns Destination Packet ID Number to each Page Record |
| RSU | Sends page Record Ready message to Uplink RSU |

UPLINK PROCESSOR

|     |     |
| --- | --- |
| RSU | (To Uplink) receives Page Records Ready message |
| RSU | Loads Page Records into Page Record Block Queue |
| RSU | Sends page Records Ready message to next USU |
| USU | Receives Page Records Ready message from RSU |
| USU | Loads Page Records into ram buffer |
| USU | Awaits Transmission Time loop |
| USU | Output Page Records in Block format |

SATELLITE SYSTEM SENDS TO DOWNLINK DESTINATION RCC SITE PROCESSOR

|     |     |
| --- | --- |
| DSU | Detects record block with correct Destination ID |
| DSU | Signals next DSU to prepare for input |
| DSU | Finishes input of Page Record |
| DSU | Signals 'GO' to next DSU |
| DSU | Checks and corrects received Page Record |
| DSU | Requests and obtains a Packet ID from the local SSU |
| DSU | Stores PAGREC in CURRENT PAGE BUFFER |
| DSU | Determines that PAGREC is not a Page but an update |
| DSU | Sends Pager Update Record Holding to ASU |

ACCOUNTING SERVICE UNIT

|     |     |
| --- | --- |
| ASU | Receives Pager Update Record Holding from DSU |
| ASU | Looks up Pager Account Number in Pager Control Block File |
| ASU | Installs Pager Cap Code in Pager Control Block |
| ASU | Installs Owner Service in Pager Control Block |
| ASU | Installs Current Location in Pager Control Block |
| ASU | Installs Current Status in Pager Control Block |
| ASU | Writes pager Control Block to File |
| ASU | Returns to Wait State |

TABLE 11
PROCESS LEVEL BACKGROUND FUNCTIONS

System operations requires a number of background functions, and functions which have not been previously discussed. These functions are transparent to the system.
SSU - Status Service Unit - The SSU performs monitoring of all processes in the system and attempts to correct errors if they occur. The process failure detection sequence depends upon each process in the system 'reporting' to the SSU periodically by sending a 'tick'. The timers used to determine when a process has failed are dependent upon an RTC interrupt.
The SSU also maintains a data table which can be interrogated by a local process. The SSU normally runs in

TABLE 11-continued
PROCESS LEVEL BACKGROUND FUNCTIONS the Utility Processor, therefore the STATUS utility program
is capable of displaying the SYSTEM status.
SSU   Receives 'tick' from external process
      SSU resets process timer to max value
SSU   Receives timer interrupt
      SSU decrements all timers
      If process timer times out
      SSU requests 'reset' by master of faulty process
      SSU updates status table showing reset
      If environment status timer times out
      SSU interrogates the external Status Monitor Device
      SSU fills in status form
      SSU checks for out-of range condition
      If condition out-of range
      SSU initiates Service Request via Page Record
SSU   Receives Packet ID request
      SSU sends packet ID to requesting process
      SSU increments Packet ID counter
      If Packet ID counter exceeds 4096
      SSU reset packet ID counter to 0
      END
DSU - Downlink Service Unit - The DSU also looks for page
records from the downlink which match the local "Owner
System". When one is detected, the record is stored and the
ASU is notified.
DSU   Detects page Record with correct 'Woner System'
DSU   Requests and receives a Packet ID number from the SSU
DSU   Stores the Page Record
DSU   Sends 'Page Record Holding Message' to ASU
      END
ASU - Accounting Service Unit - The ASU is respondsible for
posting pages to local pager accounts. The DSU will send a
Page Record each time it detects one on the downlink.
The ASU is also the local system whenever a Pager Update is
received (see Additional Operator Functions).
ASU   Receives 'page Record Holding Message' from DSU
ASU   Locates the account record in the local account file
      If the page was local
      ASU increments the Local Page Counter
      If the page was National
      ASU increments the National Page Counter
      END The present invention has been described in detail in connection with preferred embodiments. These embodiments, however, are merely examples and the invention is not restricted thereto. It will be understood by those skilled in the art from a reading of the specification that variations and modifications can be made within the scope of the present invention as defined by the appended claims.

We claim:

1. In a radio paging system comprising input means for inputting paging information, a plurality of radio common carriers located in the same geographical area, each of said common carriers being adapted to broadcast a paging signal having a predetermined format on a predetermined frequency, the improvement comprising:

network means coupled to said input means and to said plurality of radio common carriers for connecting said plurality of radio common carriers into a network, said network means being adapted to receive paging information from said input means over a first transmission path and providing said paging information to a selected one of said radio common carriers over a second transmission path for radio broadcast; and receiver means for receiving said paging signal broadcast by any one of said radio common carriers, said receiver means comprising
   antenna means for receiving said paging signal;
   oscillator means for providing a reference signal;
   mixer means coupled to said antenna means and to said oscillator means for mixing said paging signal with said reference signal to produce a second paging signal;
   logic means coupled to said oscillator means for controlling said oscillator means to generate said reference signal at a selected one of a plurality of predetermined frequencies, wherein said receiver means is caused to scan predetermined frequencies;
   detector means coupled to the output of said mixer means for receiving said second paging signal and detecting said paging signal on any one of said scanned predetermined frequencies and providing a detection signal when said paging signal is received, said logic means receiving said detection signal and controlling said oscillator means to lock said receiver means onto the current scanned frequency and receive said paging signal;
   decoder means for decoding said second paging signal to retrieve said paging information; and
   output means coupled to said decoder means for outputting to a user at least some of said paging information.

2. In the radio paging system of claim 1 wherein said logic means is a microprocessor.

3. In the radio paging system of claim 1 wherein said receiver means further includes energy saver means coupled to said logic means for repetitively switching said receiver means between a first energy consumption level and a lower energy consumption level, said paging signal being detected by said detector means when said receiver means is operating at said first energy consumption level.

4. In the radio paging system of claim 3 wherein said paging signal includes a first preamble code and a second preamble code, said logic means causing said receiver means to operate at said first energy consumption level for repetitive predetermined periods of time, said logic means causing said paging receiver means to remain at said first energy consumption level when said first preamble code is detected and to return to repetitive operation between said first energy consumption level and said lower energy consumption level if said second preamble code is not detected within a predetermined time after said first preamble code is detected.

5. In the radio paging system of claim 1 wherein said logic means controls said local oscillator to cause said receiver means to remain tuned to each of said predetermined frequencies for a predetermined dwell time, if said paging signal is not received within said dwell time, said logic means controlling said local oscillator means to cause said receiver means to tune to another of said predetermined frequencies.

6. In the radio paging system of claim 5 wherein said logic means controls said local oscillator means to cause said receiver means to remain tuned to the current frequency beyond said dwell time when said paging signal is received.

7. In the radio paging system of claim 5 wherein said receiver means remains tuned to the current frequency for a receive time of predetermined duration.

8. In the radio paging system of claim 7 wherein the duration of said receive time is determined by the length of said paging signal.

9. In the radio paging system of claim 7 wherein the duration of said receiver time is a function of said paging signal.

10. In the radio paging system of claim 7 wherein the duration of said receive time is predetermined by the information within said paging signal.

11. In the radio paging system of claim 1 wherein said predetermined format of said paging signal comprises a preamble code word of predetermined duration, a synchronization code word and a data packet, said data packet containing said paging information.

12. In the radio paging system of claim 1 wherein said receiver means further includes energy saver means coupled to said logic means for repetitively switching said receiver means between a first energy consumption level and a lower energy consumption level at a predetermined rate, the time duration between said first energy consumption level and said second energy consumption level being equal to or less than the duration of said preamble code word, said logic means causing said receiver means to remain at said first energy consumption level when said preamble code word is detected and to return to repetitive operation between said first energy consumption level and said lower energy consumption level if said synchronization code word is not detected within a predetermined time after said preamble code word is detected, upon detection of said synchronization code word, said logic means causing said receiver means to remain at said first energy consumption level for the duration of said synchronization code word.

13. In the radio paging system of claim 12 wherein said synchronization code word includes addressing information which identifies selected receiver means, said logic means having address means which identifies said receiver means, said logic means also having comparison means for comparing said addressing information in said synchronization code word and controlling said local oscillator means to tune said receiver means to another of said plurality of frequencies when said addressing information does not correspond to the identity of said receiver means.

14. In the radio paging system of claim 12 wherein said synchronization code word includes timing information which identifies the time domain of said data packet, in response to said timing information, said logic means causing said receiver means to be at said first energy consumption level during the time domain of said data packet for receiving said data packet.

15. In the radio paging system of claim 14 wherein said logic means causes said receiver means to return to said second energy consumption level after said data packet is received.

16. In the radio paging system of claim 11 wherein the duration of said preamble code word exceeds the length of time required for said receiver means to scan each of said plurality of frequencies.

17. In the radio paging system of claim 1 wherein said predetermined format of said paging signal comprises a first preamble code word of a first predetermined duration and a second preamble code word of a second predetermined duration, a synchronization code word and a data packet, said data packet containing said paging information.

18. In the radio paging system of claim 17 wherein said receiver means further includes energy saver means coupled to said logic means for repetitively switching said receiver means between a first energy consumption level and a lower energy consumption level at a predetermined rate, the time duration between said first energy consumption level and said second energy consumption level being equal to or less than the duration of said first preamble code word, said logic means causing said receiver means to remain at said first energy consumption level when said first preamble code word is detected and to return to repetitive operation between said first energy consumption level and said lower energy consumption level if said second preamble code word is not detected within a predetermined time after said first preamble code word is detected, upon detection of said second preamble code word, said logic means causing said receiver means to remain of said first energy consumption level for the duration of said second preamble code word.

19. In the radio paging system of claim 18 wherein said first preamble code word is formed of a sequence of logic reversals (101010 . . . ) repeating for a predetermined period of time at a predetermined rate.

20. In the radio paging system of claim 19 wherein said predetermined rate is 218 Hz.

21. In the radio paging system of claim 19 wherein said predetermined period of time is 1200 msec. and said predetermined rate is 500 Hz.

22. In the radio paging system of claim 18 wherein said second preamble code word is formed of a sequence of logic reversals (101010 . . . ) repeating for a predetermined period of time at a predetermined rate.

23. In the radio paging system of claim 22 wherein said predetermined rate is 256 Hz.

24. In the radio paging system of claim 22 wherein said predetermined period of time is 1125 msec. and said predetermined rate is 256 Hz.

25. In the radio paging system of claim 18 wherein said synchronization code word includes addressing information which identifies selected receiver means, said logic means having address means which identifies said receiver means, said logic means also having comparison means for comparing said addressing information in said synchronization code word and controlling said local oscillator means to tune said receiver means to another of said plurality of frequencies when said addressing information does not correspond to the identity of said receiver means.

26. In the radio paging system of claim 18 wherein said synchronization code word includes timing information which identifies the time domain of said data packet, in response to said timing information said logic means causing said receiver means to be at said first energy consumption level during the time domain of said data packet for receiving said data packet.

27. In the radio paging system of claim 26 wherein said logic means causes said receiver means to return to said second energy consumption level after said data packet is received.

28. In the radio paging system of claim 18 wherein the duration of said preamble code word exceeds the length of time required for said receiver means to scan each of said plurality of frequencies.

29. A scanning radio paging receiver for a paging system formed of a network of radio common carriers, said network having input means for inputting paging information and network means coupled to said input means and to said plurality of radio common carriers for connecting said plurality of radio common carriers into a network, said network means being adapted to receive paging information from said input means over a first transmission path and providing said paging information to a selected one of said radio common carriers over a second transmission path for radio broadcast, receiver means for receiving said paging information broadcast by any one of said radio common carriers, said receiver comprising:

antenna means for receiving a paging signal;

oscillator means for providing a reference signal;

mixer means coupled to said antenna means and to said oscillator means for mixing said paging signal with said reference signal to produce a second paging signal;

logic means coupled to said oscillator means for controlling said oscillator means to generate said reference signal at a selected one of a plurality of predetermined frequencies, wherein said receiver is caused to scan predetermined frequencies, and wherein said logic means controls said oscillator to cause said receiver to remain tuned to each of said scanned predetermined frequencies for a predetermined dwell time, if said paging signal is not received within said dwell time, said logic means controlling said oscillator means to cause said receiver to tune to another of said scanned predetermined frequencies;

detector means coupled to the output of said mixer means for receiving said second paging signal and detecting said paging signal on any one of said scanned predetermined frequencies and providing a detecting signal when said paging signal is received, said logic means receiving said detection signal and controlling said oscillator means to lock said receiver onto the current scanned frequency and receive said paging signal;

decoder means for decoding said second paging signal to retrieve paging information; and output means coupled to said decoder means for outputting to a user at least some of said paging information.

30. In the radio receiver of claim 29 wherein said logic means controls said local oscillator means to cause said receiver to remain tuned to the current frequency beyond said dwell time when said paging signal is received.

31. In the radio receiver of claim 29 wherein said receiver remains tuned to the current frequency for a receiver time of predetermined duration.

32. In the radio receiver of claim 31 wherein the duration of said receive time is determined by the length of said paging signal.

33. In the radio receiver of claim 31 wherein the duration of said receive time is a function of said paging signal.

34. In the radio receiver of claim 31 wherein the duration of said receive time is determined by the information within said paging signal.

35. In the radio receiver of claim 29 wherein a predetermined format of said paging signal comprises a preamble code word of predetermined duration, a synchronization code word and a data packet, said data packet containing said paging information.

36. In the radio receiver of claim 35 wherein said receiver means further includes energy saver means coupled to said logic means for repetitively switching said receiver means between a first energy consumption level and a lower energy consumption level at a predetermined rate, the time duration between said first energy consumption level and said second energy consumption level being equal to or less than the duration of said preamble code word, said logic means causing said receiver to remain at said first energy consumption level when said preamble code word is detected and to return to repetitive operation between said first energy consumption level and said lower energy consumption level if said synchronization code word is not detected within a predetermined time after said preamble code word is detected, upon detection of said synchronization code word, said logic means causing said receiver to remain at said first energy consumption level for the duration of said synchronization code word.

37. In the radio receiver of claim 36 wherein said synchronization code word includes addressing information which identifies selected receivers, said logic means having address means which identifies said receiver, said logic means also having comparison means for comparing said addressing information in said synchronization code word and controlling said local oscillator means to tune said receiver to another of said plurality of frequencies when said addressing information does not correspond to the identity of said receiver.

38. In the radio receiver of claim 36 wherein said synchronization code word includes timing information which identifies the time domain of said data packet, in response to said timing information, said logic means causing said receiver to be at said first energy consumption level during the time domain of said data packet for receiving said data packet.

39. In the radio receiver of claim 38 wherein said logic means causes said receiver means to return to said second energy consumption level after said data packet is received.

40. In the radio receiver of claim 35 wherein the duration of said preamble code word exceeds the length of time required for said receiver means to scan each of said plurality of frequencies.

41. In the radio receiver of claim 29 wherein a predetermined format of said paging signal comprises a first preamble code word of a first predetermined duration and a second preamble code word of predetermined duration, a synchronization code word and a data packet, said data packet containing said paging information.

42. In the radio receiver of claim 41 wherein said receiver means further includes energy saver means coupled to said logic means for repetitively switching said receiver means between a first energy consumption level and a lower energy consumption level at a predetermined rate, the time duration between said first energy consumption level and said second energy consumption level being equal to or less than the duration of said first preamble code word, said logic means causing said receiver means to remain at said first energy consumption level when said first preamble code word is detected and to return to repetitive operation between said first energy consumption level and said lower energy consumption level if said second preamble code word is not detected within a predetermined time after said first preamble code word is detected, upon detection of said second preamble code word, said logic means causing said second receiver means to remain at said first energy consumption level for the duration of said second preamble code word.

43. In the radio receiver of claim 42 wherein said first preamble code word is formed of a sequence of logic reversals (101010 . . . ) repeating for a predetermined period of time at a predetermined rate.

44. In the radio receiver of claim 43 wherein said predetermined rate is 218 Hz.

45. In the radio receiver of claim 43 wherein said predetermined period of time is 1200 msec. and said predetermined rate is 500 Hz.

46. In the radio receiver of claim 42 wherein said second preamble code word is formed of a sequence of logic reversals (101010 . . . ) repeating for a predetermined period of time at a predetermined rate.

47. In the radio receiver of claim 46 wherein said predetermined rate is 256 Hz.

48. In the radio receiver of claim 46 wherein said predetermined period of time is 1125 msec. and said predetermined rate is 256 Hz.

49. In the radio receiver of claim 42 wherein said synchronization code word includes addressing information which identifies selected receivers, said logic means having address means which identifies said receiver, said logic means also having comparison means for comparing said addressing information in said synchronization code word and controlling said local oscillator means in tune said receiver to another of said plurality of frequencies when said addressing information does not correspond to the identity of said receiver.

50. In the radio receiver of claim 42 wherein said synchronization code word includes timing information which identifies the time domain of said data packet, in response to said timing information said logic means causing said receiver means to be at said first energy consumption level during the time domain of said data packet for receiving said data packet.

51. In the radio receiver of claim 50 wherein said logic means causes said receiver to return to said second energy consumption level after said data packet is received.

52. In the radio receiver of claim 42 wherein the duration of said preamble code word exceeds the length of time required for said receiver means to scan each of said plurality of frequencies.

53. The scanning radio paging receiver of claim 29 wherein said logic means is a microprocessor.

54. The scanning radio paging receiver of claim 29 further comprising energy saver means coupled to said logic means for repetitively switching said paging receiver between a first energy consumption level and a lower energy consumption level, said paging signal being detected by said detector means when said paging receiver is operating at said first energy consumption level.

55. The scanning radio paging receiver of claim 54 wherein said paging signal includes a first preamble code and a second preamble code, said logic means causing said paging receiver to operate at said first energy consumption level for repetitive predetermined periods of time, said logic means causing said paging receiver to remain at said first energy consumption level when said first preamble code is detected and to return to repetitive operation between said first energy consumption level and said lower energy consumption level if said second preamble code is not detected within a predetermined time after said first preamble code is detected.

* * * * *